(12) United States Patent
Kyung et al.

(10) Patent No.: US 11,363,516 B2
(45) Date of Patent: Jun. 14, 2022

(54) ELECTRONIC DEVICE AND METHOD FOR BEAM FAILURE RECOVERY

(71) Applicant: MEDIATEK SINGAPORE PTE. LTD., Singapore (SG)

(72) Inventors: Gyu Bum Kyung, San Jose, CA (US); Tzu-Han Chou, San Jose, CA (US); Weidong Yang, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/821,425

(22) Filed: Mar. 17, 2020

(65) Prior Publication Data

US 2020/0314722 A1 Oct. 1, 2020

Related U.S. Application Data

(60) Provisional application No. 62/863,948, filed on Jun. 20, 2019, provisional application No. 62/841,908, (Continued)

(51) Int. Cl.
*H04W 36/36* (2009.01)
*H04W 36/30* (2009.01)
(Continued)

(52) U.S. Cl.
CPC .......... *H04W 36/36* (2013.01); *H04W 36/06* (2013.01); *H04W 36/305* (2018.08);
(Continued)

(58) Field of Classification Search
None
See application file for complete search history.

(56) References Cited

U.S. PATENT DOCUMENTS

2013/0010711 A1   1/2013  Larsson et al.
2016/0233989 A1*  8/2016  Belghoul .............. H04L 5/0092
(Continued)

FOREIGN PATENT DOCUMENTS

CN      108809580 A      11/2018
WO   WO 2018/196851 A1   11/2018

OTHER PUBLICATIONS

International Search Report and Written Opinion dated Jul. 3, 2020 in PCT/CN2020/081658, 9 pages.

(Continued)

*Primary Examiner* — Jutai Kao
(74) *Attorney, Agent, or Firm* — Oblon, McClelland, Maier & Neustadt, L.L.P.

(57) ABSTRACT

Aspects of the disclosure provide an electronic device including processing circuitry and a method for beam failure recovery (BFR). When beam failure is determined to occur on at least one of a plurality of cells configured for the electronic device, the processing circuitry can send a BFR scheduling request (SR) to a network. The BFR SR can indicate the beam failure and requesting resources to report the beam failure. The processing circuitry can receive priority scheduling for the resources from the network. The processing circuitry can send a BFR request (BFRQ) using the resources. The BFRQ can indicate cell information of the at least one of the plurality of cells and new beam information of one or more new candidate beams for the at least one of the plurality of cells.

18 Claims, 14 Drawing Sheets

Related U.S. Application Data filed on May 2, 2019, provisional application No. 62/824,458, filed on Mar. 27, 2019.

(51) Int. Cl.
  *H04W 72/12* (2009.01)
  *H04W 74/08* (2009.01)
  *H04W 36/06* (2009.01)

(52) U.S. Cl.
  CPC ... *H04W 72/1242* (2013.01); *H04W 72/1268* (2013.01); *H04W 72/1284* (2013.01); *H04W 74/0833* (2013.01)

(56) References Cited

U.S. PATENT DOCUMENTS

| | | | |
|---|---|---|---|
| 2018/0279136 A1 | 9/2018 | Tsai et al. | |
| 2018/0279379 A1 | 9/2018 | Tsai et al. | |
| 2018/0323856 A1 | 11/2018 | Xiong et al. | |
| 2019/0089447 A1* | 3/2019 | Sang | H04W 36/305 |
| 2019/0253986 A1* | 8/2019 | Jeon | H04W 72/042 |
| 2019/0289588 A1* | 9/2019 | Akkarakaran | H04W 72/046 |
| 2020/0092785 A1 | 3/2020 | Yang | |
| 2020/0145280 A1* | 5/2020 | Cirik | H04L 41/0668 |
| 2020/0229257 A1* | 7/2020 | Venugopal | H04W 76/18 |
| 2020/0244337 A1* | 7/2020 | Yuan | H04W 72/0466 |
| 2020/0267048 A1* | 8/2020 | Yu | H04L 1/1822 |
| 2020/0274606 A1* | 8/2020 | Kang | H04L 5/0051 |
| 2020/0351054 A1* | 11/2020 | Jung | H04L 5/0048 |
| 2021/0058998 A1* | 2/2021 | Yuan | H04W 72/0413 |
| 2021/0067231 A1* | 3/2021 | Yang | H04W 76/19 |

OTHER PUBLICATIONS

International Search Report and Written Opinion dated Jul. 1, 2020 in PCT/CN2020/081585, 9 pages.
NEC, "Discussion on beam failure recovery", 3GPP TSG RAN WG1 Meeting #95, R1-1812646, Nov. 16, 2018; 2 pages.
Samsung, "Corrections on Beam Failure Recovery", 3GPP TSG RAN WG1 Meeting #92bis, R1-1806716, Apr. 20, 2018, 4 pages.
Hua Wei et al., "Beam failure recovery for SCell", 3GPP TSG RAN W1I Meeting #94bis, R1-1810106, 12 Oct. 12, 2018, 6 pages.
Hua Wei et al., "Beam failure recovery for Scell", 3GPP TSG RAN WG1 Meeting #95 R1-1813561, Nov. 16, 2018, 7 pages.
Mediatek Inc., "Remaining Issues for Beam Management and Beam Failure Recovery", 3GPP TSG RAN WG1 Meeting #94, R1-1808264, Aug. 24, 2018; 7 pages.
Combined Taiwanese Office Action and Search Report dated Nov. 19, 2020 in corresponding Taiwanese Patent Application No. 109109458 (with English Translation of Category of Cited Documents), 9 pages.
Combined Taiwanese Office Action and Search Report dated Dec. 18, 2020 in corresponding Taiwanese Patent Application No. 109110217 (with English Translation of Category of Cited Documents), 9 pages.
Office Action dated Jul. 29, 2021 in corresponding Taiwanese Patent Application No. 109110217; 5 pages.
Taiwanese Office Action dated May 27, 2021 in Taiwanese Patent Application No. 109109458, 4 pages.

\* cited by examiner

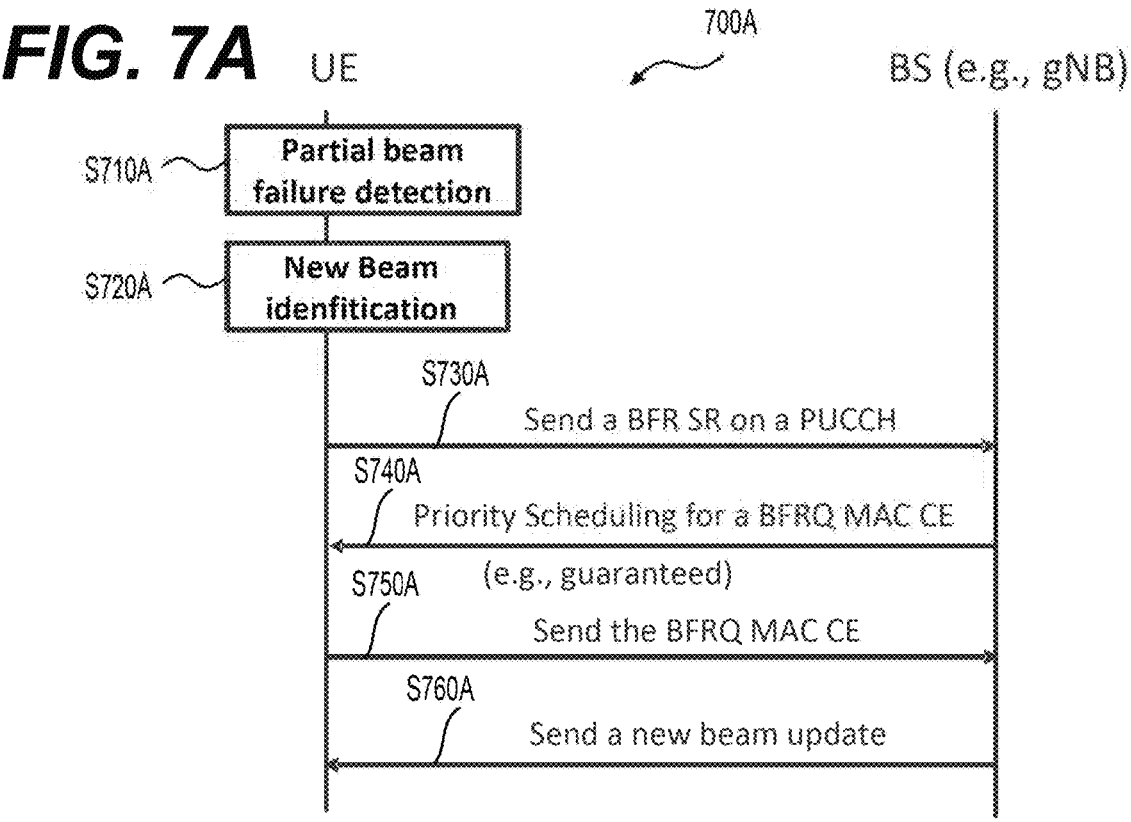
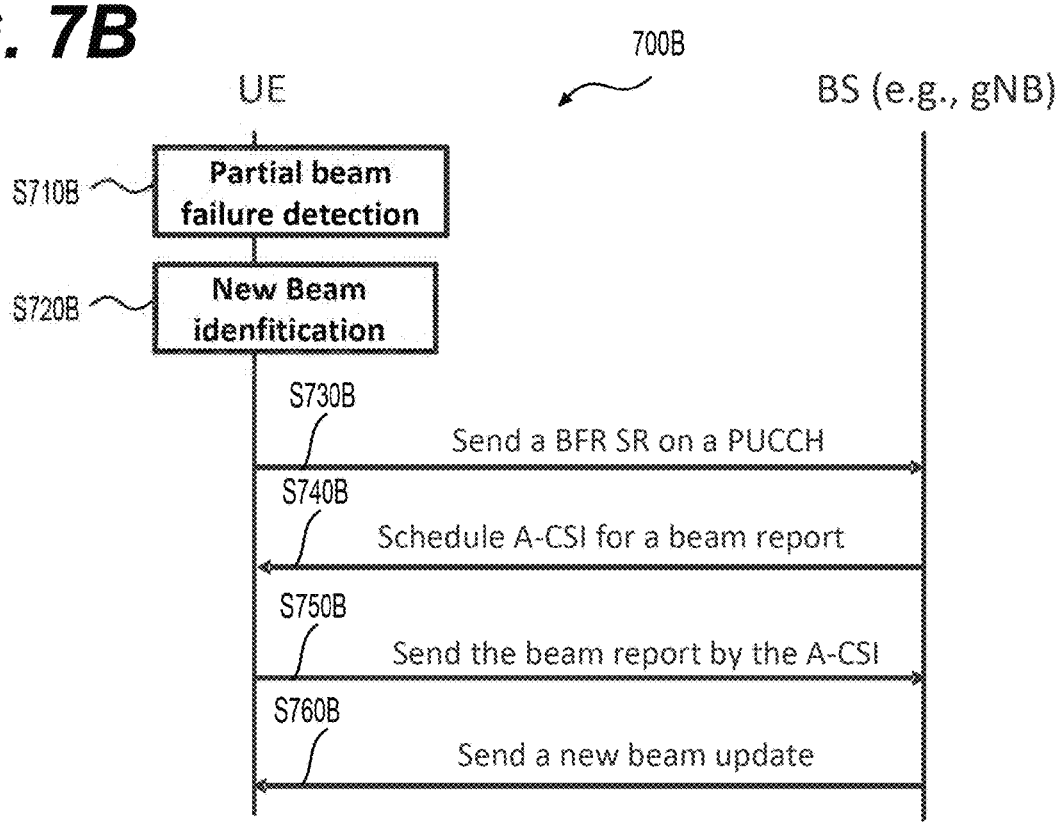

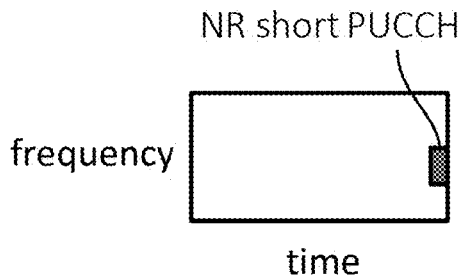
FIG. 11A
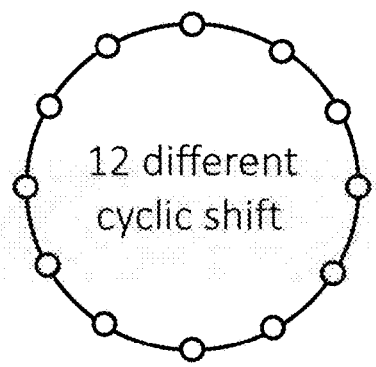
FIG. 11B
| NR Format | Format 0 |
|---|---|
| Symbol No. | 1~2 (short) |
| PRB No. | 1 |
| UCI bits | 1 or 2 |
| UE mux | Up to 12 |
FIG. 11C
12 different cyclic shift
$$\bar{r}_{u,v}(n) = e^{j\varphi(n)\pi/4}, \quad 0 \le n \le M_{ZC} - 1$$
| u | $\varphi(0),\ldots,\varphi(11)$ | | | | | | | | | | | |
|---|---|---|---|---|---|---|---|---|---|---|---|---|
| 0 | 1 | -1 | 3 | 1 | 1 | -1 | -1 | -1 | 1 | 3 | -3 | 1 |
| 1 | -1 | -1 | -1 | -1 | 1 | -3 | -1 | 3 | 3 | -1 | -3 | 1 |
| 2 | -3 | 1 | -3 | -3 | -3 | 3 | -3 | -1 | 1 | 1 | 1 | -3 |
| 3 | -3 | 3 | 1 | 3 | -3 | 1 | 1 | 1 | 1 | 3 | -3 | 3 |
| 4 | -3 | 3 | -1 | 1 | -3 | -3 | -1 | -1 | 3 | 1 | 1 | -3 |
| 5 | -1 | 1 | 1 | -1 | 1 | 3 | 3 | -1 | -1 | -3 | 1 | -3 |
| 6 | -3 | -3 | -1 | 3 | 3 | 3 | -3 | 3 | -3 | 1 | -1 | -3 |
| 7 | -3 | 3 | -3 | 3 | 3 | -3 | -1 | -1 | 3 | 3 | 1 | -3 |
| 8 | -3 | -1 | -3 | -1 | -1 | -3 | 3 | 3 | -1 | -1 | 1 | -3 |
| 9 | -3 | 3 | 3 | 3 | -1 | -3 | -3 | -1 | -3 | 1 | 3 | -3 |
| 10 | 1 | 3 | -3 | 1 | 3 | 3 | 3 | 1 | -1 | 1 | -1 | 3 |
| 11 | -1 | -3 | 3 | -1 | -3 | -3 | -3 | -1 | 1 | -1 | 1 | -3 |
| 12 | 3 | 1 | 3 | 1 | 3 | -3 | -1 | 1 | 3 | 1 | -1 | -3 |
| 13 | -3 | 3 | 3 | 3 | -3 | -1 | 1 | -3 | 3 | 1 | -3 | -3 |
| 14 | -3 | -1 | 1 | -3 | 1 | 3 | 3 | 3 | -1 | -3 | 3 | 3 |
| 15 | -3 | -3 | 3 | 1 | -3 | -3 | -3 | -1 | 3 | -1 | 1 | 3 |
| 16 | -1 | 1 | 3 | -3 | 1 | -1 | 1 | -1 | -1 | -3 | 1 | -1 |
| 17 | -3 | -1 | -1 | 1 | 3 | 1 | 1 | -1 | 1 | -1 | -3 | 1 |
| 18 | -3 | -1 | 3 | -3 | -3 | -1 | -3 | 1 | -1 | -3 | 3 | 3 |
| 19 | -3 | -3 | 3 | -3 | -1 | 3 | 3 | 3 | -1 | -3 | 1 | -3 |
| 20 | -3 | 1 | -1 | -1 | 3 | 3 | -3 | -1 | -1 | -3 | -1 | -3 |
| 21 | -3 | 1 | 3 | 3 | -1 | -1 | -3 | 3 | 3 | -3 | 3 | -3 |
| 22 | -3 | -1 | -1 | -3 | -3 | -1 | -3 | 3 | 1 | 3 | -1 | -3 |
| 23 | -3 | -1 | 3 | 1 | -3 | -1 | -3 | 3 | 1 | 3 | 3 | 1 |
| 24 | -3 | 3 | 3 | 1 | -3 | 3 | -1 | 1 | 3 | -3 | 3 | -3 |
| 25 | 3 | -1 | -3 | 3 | -3 | -1 | 3 | 3 | 3 | -3 | -1 | -3 |
| 26 | 1 | -1 | 3 | -1 | -1 | -1 | -3 | -1 | 1 | 1 | 1 | -3 |
| 27 | -3 | 3 | 1 | -3 | 1 | 3 | -1 | -1 | 1 | 3 | 3 | 3 |
| 28 | -3 | 3 | -3 | 3 | -3 | 3 | 3 | -1 | -1 | 1 | 3 | -3 |
| 29 | -3 | 3 | 1 | -1 | 3 | 3 | -3 | 1 | -1 | 1 | -1 | 1 |
FIG. 11D

FIG. 13A  FIG. 13B
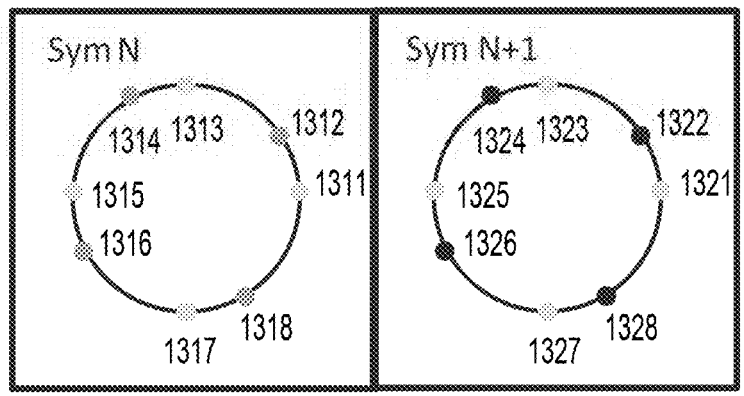
FIG. 14A  FIG. 14B
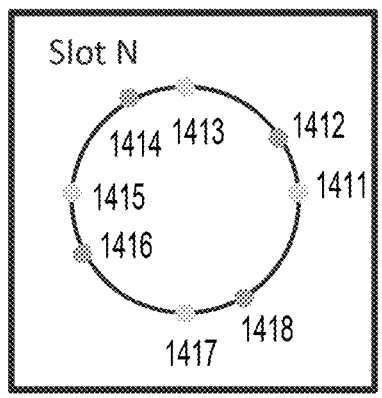 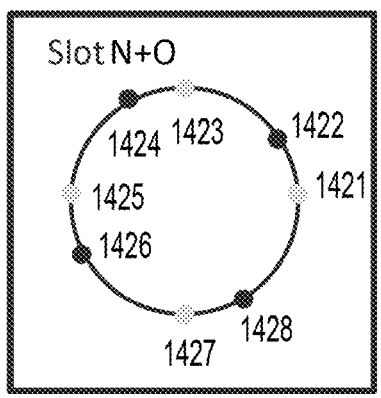
FIG. 14C  FIG. 14D
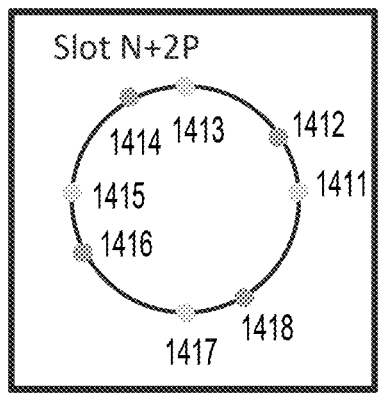 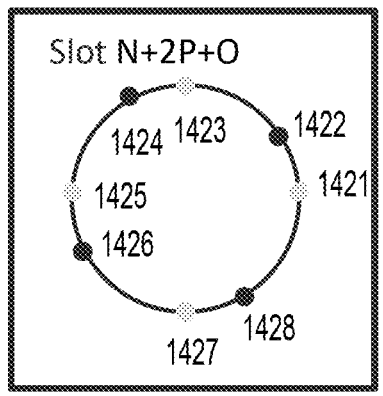

FIG. 15A

| | | | | | | | NBI for Serving Cell i | Corresponding RSRP for new beam index (optional) | NBI for Serving Cell j | Corresponding RSRP for new beam index (optional) | ... | NBI for Serving Cell k | Corresponding RSRP for new beam index (optional) |
|---|---|---|---|---|---|---|---|---|---|---|---|---|---|
| R | $C_8$ | $C_{16}$ | $C_{24}$ | | | | | | | | | | |
| $C_1$ | $C_9$ | $C_{17}$ | $C_{25}$ | | | | | | | | | | |
| $C_2$ | $C_{10}$ | $C_{18}$ | $C_{26}$ | | | | | | | | | | |
| $C_3$ | $C_{11}$ | $C_{19}$ | $C_{27}$ | | | | | | | | | | |
| $C_4$ | $C_{12}$ | $C_{20}$ | $C_{28}$ | | | | | | | | | | |
| $C_5$ | $C_{13}$ | $C_{21}$ | $C_{29}$ | | | | | | | | | | |
| $C_6$ | $C_{14}$ | $C_{22}$ | $C_{30}$ | R | | R | | | R | | | R | |
| $C_7$ | $C_{15}$ | $C_{23}$ | $C_{31}$ | E | R | E | R | | E | R | | E | R |

FIG. 15B

| | | | | | | | NBI for Serving Cell i | NBI for Serving Cell j | ... | NBI for Serving Cell k |
|---|---|---|---|---|---|---|---|---|---|---|
| R | $C_8$ | $C_{16}$ | $C_{24}$ | | | | | | | |
| $C_1$ | $C_9$ | $C_{17}$ | $C_{25}$ | | | | | | | |
| $C_2$ | $C_{10}$ | $C_{18}$ | $C_{26}$ | | | | | | | |
| $C_3$ | $C_{11}$ | $C_{19}$ | $C_{27}$ | | | | | | | |
| $C_4$ | $C_{12}$ | $C_{20}$ | $C_{28}$ | | | | | | | |
| $C_5$ | $C_{13}$ | $C_{21}$ | $C_{29}$ | | | | | | | |
| $C_6$ | $C_{14}$ | $C_{22}$ | $C_{30}$ | R | R | | R | | | |
| $C_7$ | $C_{15}$ | $C_{23}$ | $C_{31}$ | R | R | | R | | | |

| | | | | NBI for Serving Cell i | NBI for Serving Cell j | ... | NBI for Serving Cell k |
|---|---|---|---|---|---|---|---|
| $C_0$ | $C_8$ | $C_{16}$ | $C_{24}$ | | | | |
| $C_1$ | $C_9$ | $C_{17}$ | $C_{25}$ | | | | |
| $C_2$ | $C_{10}$ | $C_{18}$ | $C_{26}$ | | | | |
| $C_3$ | $C_{11}$ | $C_{19}$ | $C_{27}$ | | | | |
| $C_4$ | $C_{12}$ | $C_{20}$ | $C_{28}$ | | | | |
| $C_5$ | $C_{13}$ | $C_{21}$ | $C_{29}$ | | | | |
| $C_6$ | $C_{14}$ | $C_{22}$ | $C_{30}$ | R | R | | R |
| $C_7$ | $C_{15}$ | $C_{23}$ | $C_{31}$ | R | R | | R |

| | | | | NBI for Serving Cell i | Corresponding RSRP for new beam index (optional) | NBI for Serving Cell j | Corresponding RSRP for new beam index (optional) | ... | NBI for Serving Cell k | Corresponding RSRP for new beam index (optional) |
|---|---|---|---|---|---|---|---|---|---|---|
| $C_0$ | $C_8$ | $C_{16}$ | $C_{24}$ | | | | | | | |
| $C_1$ | $C_9$ | $C_{17}$ | $C_{25}$ | | | | | | | |
| $C_2$ | $C_{10}$ | $C_{18}$ | $C_{26}$ | | | | | | | |
| $C_3$ | $C_{11}$ | $C_{19}$ | $C_{27}$ | | | | | | | |
| $C_4$ | $C_{12}$ | $C_{20}$ | $C_{28}$ | | | | | | | |
| $C_5$ | $C_{13}$ | $C_{21}$ | $C_{29}$ | | | | | | | |
| $C_6$ | $C_{14}$ | $C_{22}$ | $C_{30}$ | R | R | R | R | | R | R |
| $C_7$ | $C_{15}$ | $C_{23}$ | $C_{31}$ | E | R | E | R | | E | R |

ELECTRONIC DEVICE AND METHOD FOR BEAM FAILURE RECOVERY

INCORPORATION BY REFERENCE

This present application claims the benefit of priority to U.S. Provisional Application No. 62/824,458, "Method and Apparatus for SCell Beam Failure Recovery" filed on Mar. 27, 2019, U.S. Provisional Application No. 62/841,908, "Method and Apparatus for Beam Failure Recovery" filed on May 2, 2019, and U.S. Provisional Application No. 62/863,948, "Method and Apparatus for 2 Step RACH Beam Failure Recovery" filed on Jun. 20, 2019, which are incorporated by reference herein in their entireties.

TECHNICAL FIELD

The present application relates generally to wireless communication technology including beam-formed transmission and reception.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

High frequency bands (e.g., above 6 GHz) are used in 5th Generation (5G) wireless communication systems to increase system capacity. Beamforming schemes can be employed to focus transmitted and/or received signal in a desired direction to compensate for path loss of high frequency signals. For example, a base station may employ multiple beams to cover a serving area in a 5G system.

SUMMARY

Aspects of the disclosure provide an electronic device including processing circuitry and a method for beam failure recovery (BFR). When beam failure is determined to occur on at least one of a plurality of cells configured for the electronic device, the processing circuitry can send a BFR scheduling request (SR) to a network. The BFR SR can indicate the beam failure and requesting resources to report the beam failure. The processing circuitry can receive priority scheduling for the resources from the network. The processing circuitry can send a BFR request (BFRQ) using the resources. The BFRQ can indicate cell information of the at least one of the plurality of cells and new beam information of one or more new candidate beams for the at least one of the plurality of cells.

In an embodiment, the plurality of cells includes a primary cell (PCell) and a secondary cell (SCell). The at least one of the plurality of cells includes the SCell. The processing circuitry can send the BFR SR to the network using a Physical Uplink Control Channel (PUCCH) configured for the PCell. The processing circuitry can receive the priority scheduling for a BFRQ MAC control element (CE) that indicates a cell index of the SCell and a new beam index for a new candidate beam for the SCell. The resources can include the BFRQ MAC CE. The cell information can include the cell index. The one or more new candidate beams can include the new candidate beam. The new beam information can include the new beam index. The processing circuitry can send the BFRQ MAC CE using a Physical Uplink Shared Channel (PUSCH) configured for the PCell and receive a BFR response (BFRR) from the network.

In an embodiment, the plurality of cells includes a PCell and an SCell. The at least one of the plurality of cells includes the SCell. The processing circuitry can send the BFR SR to the network using a PUCCH configured for the PCell. The processing circuitry can receive scheduling for an aperiodic. CSI (A-CSI) that indicates a cell index of the SCell and a new beam index for a new candidate beam for the SCell. The resources can include the A-CSI, the cell information can include the cell index, the one or more new candidate beams can include the new candidate beam, and the new beam information can include the new beam index. The processing circuitry can send the A-CSI on a PUCCH configured for the PCell and receive a BFRR from the network.

In an embodiment, the at least one of the plurality of cells is a PCell configured with one or more serving control channels to communicate with the network. The processing circuitry can determine that the beam failure occurs on the PCell when at least one of the one or more serving control channels fails.

In an example, the processing circuitry can send the BFR SR to the network using a PUCCH configured for the PCell. The processing circuitry can receive the priority scheduling for a BFRQ MAC CE that indicates a cell index of the PCell and a new beam index for a new candidate beam for the PCell. The resources can include the BFRQ MAC CE, the cell information can include the cell index, the one or more new candidate beams can include the new candidate beam, and the new beam information can include the new beam index. The processing circuitry can send the BFRQ MAC CE using a PUSCH configured for the PCell and receive a new beam update from the network.

In an example, the processing circuitry can send the BFR SR includes sending the BFR SR to the network using a PUCCH configured for the PCell. The processing circuitry can receive scheduling for an A-CSI that indicates a cell index of the PCell and a new beam index for a new candidate beam. The resources can include the A-CSI, the cell information can include the cell index, the one or more new candidate beams can include the new candidate beam, and the new beam information can include the new beam index. The processing circuitry can send the A-CSI on a PUCCH configured for the PCell and receive a new beam update from the network.

In an embodiment, the BFR SR has a BFR SR configuration including a period and an offset. In an example, the BFR SR configuration is associated with a PUCCH format 0 that includes multiple cyclic shifts. One or more of the multiple cyclic shifts can be configured for at least one of: 1) the BFR SR and 2) the BFR SR and at least one of hybrid automatic repeat requests (HARQs). In an example, when the BFR SR is scheduled at a same time with a SR, the processing circuitry can send the BFR SR prior to sending the SR or send the BFR SR and the SR simultaneously.

In an example, the plurality of cells includes a first subset of cells and a second subset of cells, the BFR SR configuration is configured for the first subset of cells to report a beam failure for the first subset of cells where the first subset of cells includes the at least one of the plurality of cells. Another BFR SR configuration is configured for the second subset of cells to report a beam failure for the second subset of cells.

In an embodiment, the resources include a BFRQ MAC CE sent on a PUSCH. The BFRQ MAC CE indicates the cell information and the new beam information. The cell information includes at least one cell index corresponding to the at least one of the plurality of cells. The new beam information includes at least one new beam index for the at least one of the plurality of cells. In an example, the at least one of the plurality of cells includes an SCell and/or a PCell.

In an embodiment, the resources include an A-CSI sent on a PUCCH. The A-CSI indicates the cell information and the new beam information. The cell information includes at least one cell index corresponding to the at least one of the plurality of cells. The new beam information includes at least one new beam index for the at least one of the plurality of cells. In an example, the at least one of the plurality of cells includes an SCell and/or a PCell.

BRIEF DESCRIPTION OF THE DRAWINGS

Various embodiments of this disclosure that are proposed as examples will be described in detail with reference to the following figures, wherein like numerals reference like elements, and wherein:

FIGS. 5, 6, 7A, 7B, 8, and 9 show flow charts of exemplary processes 500, 600, 700A, 700B, 800, and 900, respectively, according to embodiments of the disclosure;

FIGS. 11A-11D show an example of PF0 according to an embodiment of the disclosure;

FIGS. 13A-13B show an example where PF0 has 2 symbols according to an embodiment of the disclosure;

FIGS. 14A-14D show an example of a BFR SR configuration according to embodiments of the disclosure; and FIGS. 15A-11D show examples of BFRQ MAC CE formats according to embodiments of the disclosure.

DETAILED DESCRIPTION OF EMBODIMENTS

Figure 1:
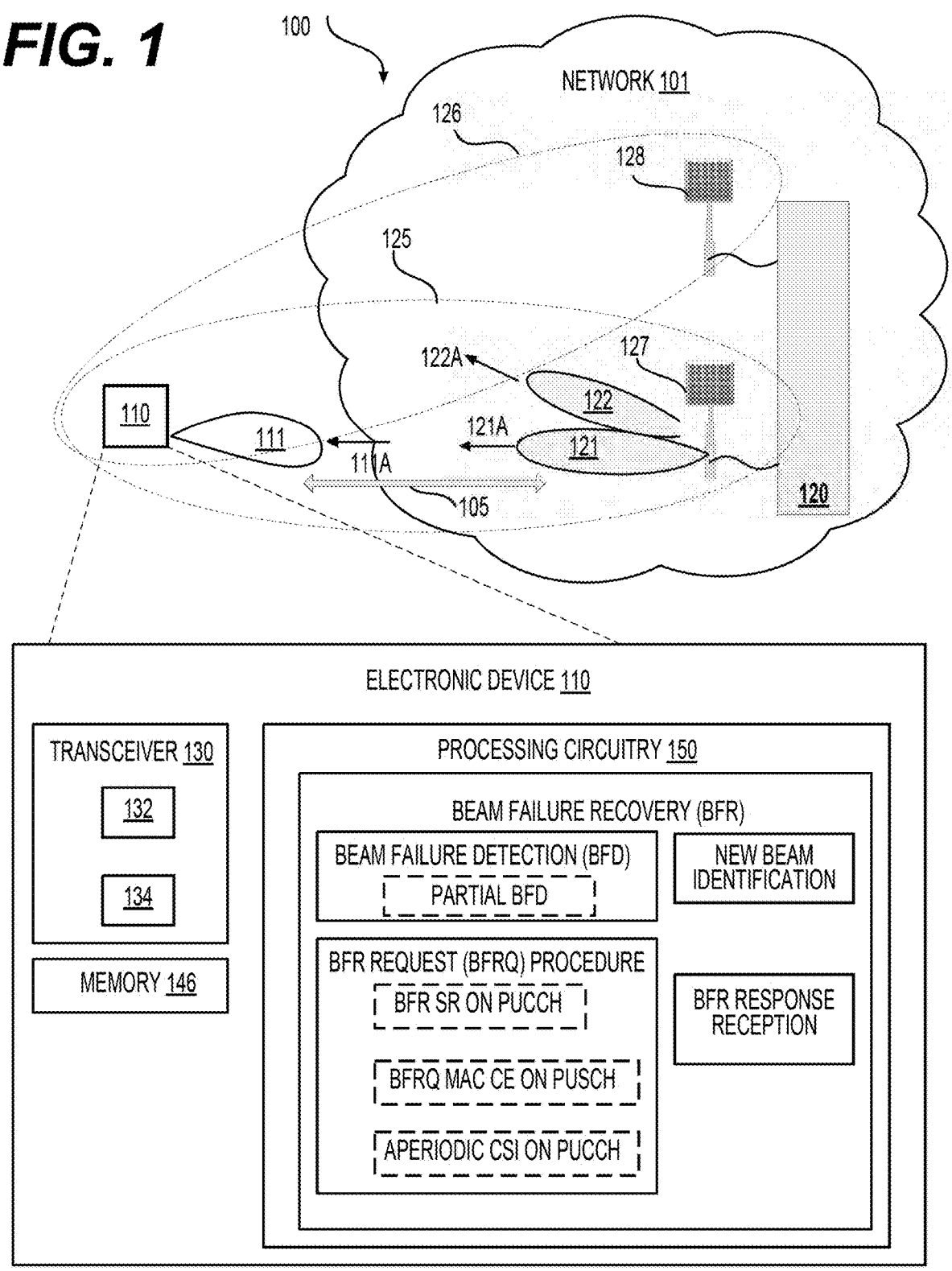
FIG. 1 shows a block diagram of an exemplary communication system 100 according to an embodiment of the disclosure.

FIG. 1 shows a block diagram of an exemplary communication system 100 according to an embodiment of the disclosure. The communication system 100 includes a network 101 and an electronic device 110 that receives wireless communication service from the network 101. One or more cells can be configured to serve the electronic device 110, for example, by a base station 120 in the network 101. The one or more cells can include a first cell 125 having a first carrier and a second cell 126 having a second carrier. The first carrier and the second carrier can be aggregated and transmitted in parallel to/from the electronic device 110 in carrier aggregation (CA), and thus increasing a bandwidth and a date rate. In an example, the base station 120 can control a first transmission reception point (TRP) 127 to cover the first cell 125 and a second TRP 128 to cover the second cell 126. In an example, the network 101 includes a fifth generation (5G) radio access network (RAN) (or Next Generation (NG) RAN) and a 5G core network (5GC) that uses 5G mobile network technology. The base station 120 is a next generation Node B (gNB) specified in 5G new radio (NR) air interface standards developed by 3rd Generation Partnership Project (3GPP).

In an embodiment, in the first cell 125, the electronic device 110 communicates wirelessly with the base station 120 via a wireless link 105 (also referred to as a link 105) associated with a beam 121 transmitted from the base station 120 and a beam 111 received by the electronic device 110. In general, a beam is allocated with radio resources including a set of time and/or frequency resources. In some embodiments, a beam is further associated with a direction indicating a dominant propagation direction of signal energy of the beam. For example, in the first cell 125, beams 121-122 transmitted from the first TRP 127 of the base station 120 mainly propagate along directions 121A-122A, respectively, thus, are referred to as transmission beams (Tx beams) 121-122 of the base station 120. The beam 111 can be referred to as the reception beam (Rx beam) 111 that mainly propagates along a direction 111A. In some embodiments, a beam can refer to a signal or a channel transmitted from or received by the electronic device 110 or the base station 120.

In general, beam management e.g., a set of procedures to acquire end maintain a set of Tx and Rx beams, is implemented to form and maintain a suitable link between the base station 120 and the electronic device 110 for uplink (UL) and downlink (DL) transmission/reception. In some embodiments, beam management can include initial beam establishment, beam adjustment (also referred to as beam tracking), and beam failure recovery. The initial establishment can initially establish the link (or a beam pair such as the link 105 including the beams 121 and 111) between the base station 120 and the electronic device 110. After the link is established, beam adjustment including a regular reevaluation and potential adjustment of the beam pair can be used to compensate for movements and rotations of the electronic device 110, gradual changes in an environment, and the like. A feedback rate for a beamformed channel state can refer to a frequency of the regular reevaluation of the beam pair. While a higher feedback rate can provide more up-to-date information of the beam pair, the higher feedback rate can also result in a larger signaling overhead. In some cases, movements in the environment or other events may result in sudden blockage of the beam pair, and thus a sudden connection loss that occurs faster than the feedback rate and without sufficient time for the beam adjustment to adapt, resulting in beam failure on the first cell 125. The beam failure (also referred to as a beam failure event) on the first cell 125 can occur, for example, when the link is broken and there is no sufficient time for the regular beam adjustment to adapt the broken link. Accordingly, a set of procedures (also referred to beam failure recovery or BFR, beam recovery, a BFR procedure) can be implemented to handle the beam failure. In an embodiment, the BFR can include a plurality of steps: beam failure detection, new beam identification, a BFR request (BFRQ) procedure, BRF response (BFRR) reception, and/or the like.

According to aspects of the disclosure, when beam failure is detected on the first cell 125, the electronic device 110 can send a request indicating the beam failure on the first cell 125 to the network 101. The request can request resources (e.g., an UL grant) that can be used to report additional information of the beam failure, such as cell information, new beam information, and/or the like. In an embodiment, the request is a BFR scheduling request (SR) or a SR-like request, for example, sent using a Physical Uplink Control Channel (PUCCH). The electronic device 110 can receive priority scheduling for the resources from the network 101. In an embodiment, the resources are guaranteed due to a higher priority of the request than other requests (e.g., a SR that is not related to BFR).

Further, the electronic device 110 can send a BFR report using the resources. The BFR report can indicate the cell information of the first cell 125 and the new beam information of a new candidate beam for the first cell 125. In an example, the first cell 125 is a secondary cell (SCell), and the second cell 126 is a primary cell (PCell) or a primary secondary cell (PSCell). In an example, the first cell 125 is a PCell or a PSCell, and the second cell 126 is an SCell. The BFRQ procedure can include sending the request, receiving the priority scheduling, and/or sending the BFR request.

The network 101 includes various base stations, such as the base station 120, and core nodes that are interconnected using any suitable network technology, such as wired, wireless, a cellular communication technology, a local area network (LAN), a wireless LAN (WLAN), a fiber optical network, a wide area network (WAN), a peer-to-peer network, the Internet, and the like. In some embodiments, the network 101 provides wireless communication service to electronic devices, such as the electronic device 110, using any suitable wireless communication technology, such as second generation (2G), third generation (3G), and fourth generation (4G) mobile network technologies, 5G mobile network technology, global system for mobile communication (GSM), long-term evolution (LTE). NR technology, and the like. In some examples, the network 101 employs wireless communication technologies developed by 3GPP. In an example, the base stations in the network 101 form one or more access networks and the core nodes form one or more core networks. An access network can be a RAN, such as a 5G RAN or NG RAN. A core network can be an evolved packet core (EPC), a 5GC, and the like.

In various examples, the base station 120 can be referred to as a Node B, an evolved Node B, a gNB, and the like. The base station 120 includes hardware components and software components configured to enable wireless communications between the base station 120 and the electronic device 110. Further, the core nodes include hardware components and software components to form a backbone to manage and control the services provided by the network 101.

In some embodiments, high frequencies, also referred to as millimeter Wave (mmWave) frequencies are used as carrier frequencies in the communication system 100 to increase a network capacity. In an example, the high frequencies are higher than 6 giga-Hertz (GHz), such as between 24-84 GHz. In an example, carrier frequencies less than 6 GHz are referred to as low frequencies, such as between 600 MHz to less than 6 GHz. For example, a frequency range 1 (FR1) includes frequencies below 6 GHz and a frequency range 2 (FR2) includes frequencies in the range 24.25-52.6 GHz. Signals (or beams) having mmWave frequencies as carrier frequencies, referred to as high frequency (HF) signals, can experience large propagation loss and can be sensitive to blockage. Accordingly, for the HF signals, the base station 120 and the electronic device 110 can perform beamformed transmission and/or reception to compensate for the propagation loss. In beamformed transmission: signal energy can be focused predominantly toward a specific direction, such as directions 121A-122A associated with the Tx beams 121-122, as described above. As a result, an increased antenna transmission gain can be achieved in contrast to omnidirectional antenna transmission. Similarly, in beamformed reception, signal energy received predominantly from a specific direction can be combined to obtain a higher antenna reception gain in contrast to omnidirectional antenna reception, such as a direction 111A associated with the Rx beam 111 of the electronic device 110.

Referring to FIG. 1, the base station 120 can control the first TRP 127 to form directional Tx beams including the Tx beams 121-122 to cover the first cell 125. The Tx beams can be generated simultaneously or in different time intervals. Further, the base station 120 can control the second TRP 128 to cover the second cell 126. In an example, a plurality of electronic devices is served by the base station 120. In an example, the electronic device 110 is within the first cell 125 and the second cell 126 and can be served by the first cell 125 and the second cell 126. The first cell 125 and the second cell 126 can overlap. In an example, the first cell 125 and the second cell overlaps partially as shown in FIG. 1. In an example, the first cell 125 is within the second cell 126.

BFR procedures are described below for the first cell 125 with reference to FIG. 1 where the first cell 125 and the second cell 126 are formed using the same base station 120. The description can be suitably adapted to other scenarios, such as when the first cell 125 and the second cell 126 are formed using a same TRP, when the first cell 125 and the second cell 126 are formed using different base stations, or the like.

In an embodiment, the electronic device 110 can be any suitable electronic device that can implement beam failure recovery. The electronic device 110 can be configured to receive signals from and transmit signals to a plurality of cells, such as the first and second cells 125-126 using multiple links via, for example, carrier aggregation. In an example, the electronic device 110 is a terminal device (e.g., user equipment) for wireless communication, such as a cell phone, a smart phone, a tablet computer, a laptop, a smart device, a wearable device, and the like. Similarly, the electronic device 110 can employ one or more antenna arrays to generate directional Tx or Rx beams for transmitting or receiving the HF signals. The electronic device 110 and/or the base station 120 can also include suitable transceivers and antennas that transmit and receive omnidirectional wireless signals.

In some embodiments, the electronic device 110 can be connected to multiple base stations via multiple links using dual connectivity (DC), such as in Evolved Universal Terrestrial Radio Access (E-UTRA) and NR DC. For example, the electronic device 110 is connected to the base station 120 via the link 105 and a second base station (not shown) via a second link (not shown). In an example, the electronic device 110 is connected to the second base station using directional Tx/Rx beams, omnidirectional beams, and the like. In an example, the electronic device 110 is connected to the base station 120 using NR radio access, and to the second base station using E-UTRA.

Referring to FIG. 1, the electronic device 110 can include a transceiver 130, processing circuitry 150, and memory 146 that are coupled together, for example, using a bus architecture (not shown). The transceiver 130 is configured to receive and transmit wireless signals. In an example, the transceiver 130 includes a first transceiver 132 that transmits and receives low frequency signals (LF signals), such as omnidirectional wireless signals, and a second transceiver 134 that transmits and receives the HF signals (e.g., FR2) including Tx and Rx beams. In an example, the link 105 is formed based on the Tx beam 121 and the Rx beam 111 for the electronic device 110 to receive DL signals from the base station 120. In the FIG. 1 example, a direction 111A of the Rx beam 111 is matched to the direction 121A of the Tx beam 121 by tuning respective antennas of the electronic device 110 and/or the base station 120.

In an example, the link 105 can be formed based on the Tx beam 121 and an omnidirectional reception beam (not shown) of the electronic device 110. In an example, the link 105 can be formed based on the Rx beam 111 and an omnidirectional transmission beam (not shown) of the base station 120.

The link 105 can also be used for the electronic device 110 to transmit UL signals to the base station 120 via a Tx beam of the electronic device 110 and a Rx beam of the base station 120. Further, radio resources for the UL signals, such as the Tx beam of the electronic device 110 can be different from the radio resources used for the DL signals. In an example, the electronic device 110 is configured with beam correspondence, and directions of the UL signals (the Tx beam of the electronic device 110 and the Rx beam of the base station 120) in the link 105 are opposite to the directions 111A and 121A, respectively.

In an example, the second transceiver 134 transmits or receives the HF signals (e.g., FR2), and the first transceiver 132 causes an antenna to transmit or receive the LF signals (e.g., FR1). The LF signals can include omnidirectional beams, directional beams, and/or the like. A directional beam in FR1 can be wider (e.g., having a larger angular spread) than a directional beam in FR2. For example, 4 directional beams in FR1 can cover an angular range while 64 directional beams in FR2 can cover the same angular range.

In some embodiments, the transceiver 130 is configured to receive signals (e.g., Tx beams and/or omnidirectional beams) from the network 101. The signals can include reference signals (RSs) that can be used to estimate beam and link qualities and facilitate BFR in cell(s) that serve the electronic device 110. RSs can include a channel-state information reference signal (CSI-RS), a synchronization signal block (SSB), and the like. In some embodiments, an SSB that includes resources in time and frequency is formed with a primary synchronization signal (PSS), a secondary synchronization signal (SSS), and a Physical Broadcast Channel (PBCH). In an example, RS(s) in the first cell 125 are used to detect beam failure in the first cell 125. In an example, RS(s) in the second cell 126 are used to detect beam failure in the first cell 125. In some examples, RS(s) from another base station can be used to detect beam failure in the first cell 125.

The transceiver 130 can receive scheduling used in a BFR procedure. In some embodiments, the scheduling is priority scheduling for a BFRQ Medium Access Control (MAC) Control Element (CE), aperiodic CSI (A-CSI) for beam report(s), and/or the like, and thus is guaranteed. In some embodiments, the scheduling, such as for a BFRQ MAC CE, is not guaranteed, and thus is delayed.

The transceiver 130 can receive a BFRR and/or a new beam update (e.g., indicating a new beam assigned by the network 101 for the electronic device 110) from the network 101 (e.g., the base station 120) on the first cell 125, the second cell 126, and/or the like. The transceiver 130 can receive a BFRR and/or a new beam report from the network 101 (e.g., the base station 120) on a PCell, a PSCell, an SCell, and/or the like.

The transceiver 130 is configured to transmit various signals, such as the HF signals and the LF signals. In an embodiment, the transceiver 130 can transmit an SR, a BFR SR indicating beam failure, a hybrid automatic repeat request (HARQ), and/or the like in UL control information (UCI). A HARQ can be an ACK, a NACK, or the like. The UCI can be transmitted on a PUCCH or a NR-PUCCH, for example, of a PCell or a PSCell, such as the first cell 125 or the second cell 126. The transceiver 130 can transmit a BFRQ to the base station 120, for example, using UL physical channels, such as a Physical Random Access Channel (PRACH) (e.g., contention-free (CF) PRACH, contention-based (CB) PRACH), a NR-PRACH, and the like, indicating beam failure on a cell, such as the first cell 125. In an example, the transceiver 130 can transmit cell information, new beam information, and/or the like to the base station 120 via a PUCCH (e.g., a beam report using A-CSI), a PUSCH (e.g., using a MAC CE, a BFRQ MAC CE), or the like.

The transceiver 130 can receive scheduling for a buffer status report (BSR) from the network 101 (e.g., the base station 120), for example, on a PCell or a PSCell. The scheduling for the BSR may not be guaranteed, for example, due to a low priority of the BSR. The transceiver 130 can transmit a BSR to the network 101 (e.g., the base station 120) on a PCell or a PSCell.

The processing circuitry 150 can implement BFR including beam failure detection (BFD), new beam identification, a BFRQ procedure, BFRR reception, and/or the like.

In an embodiment, the electronic device 10 is configured with one or more serving control channels (or serving control channel links) in the first cell 125. When at least one of the one or more serving control channels fails, beam failure can be declared for the first cell 125. In an example, when the one or more serving control channels fail, beam failure is declared for the first cell 125. In an example, when a quality of a serving control channel is less than a threshold, the serving control channel is determined to have failed. For example, when a block error rate (BLER) of a PDCCH is larger than a threshold (e.g., a default BLER set by Radio Link Monitoring (RLM), the PDCCH is determined to have failed.

In an example, when a subset of the one or more serving control channels fails, beam failure is declared for the first cell 125. The beam failure can be referred to as partial beam failure when a number of the subset of the one or more serving control channels is less than a number of the one or more serving control channels. For example, the electronic device 110 is configured with two serving control channels (e.g., a first PDCCH and a second PDCCH) in the first cell 125. When the first PDCCH and the second PDCCH fail, beam failure (also referred to as full beam failure) can be declared for the first cell 125. When the first PDCCH fails, partial beam failure can be declared for the first cell 125. Partial beam failure can be declared when the first cell 125 is a PCell or a PSCell.

The beam failure can be referred to as full beam failure when each of the one or more serving control channels is determined to have failed. When multiple serving control channels are configured for the electronic device 110, detecting the partial beam failure can be faster than detecting the full beam failure, and thus can shorten a duration used for beam failure detection.

The processing circuitry 150 can measure one or more signals, such as RS(s), to obtain signal qualities including reference signal received power (RSRP), reference signal received quality (RSRQ), a BLER, and the like. Beam failure detection can be based on one or more of the signal qualities. The electronic device 10Q can use an SSB, a CSI-RS, and/or the like for beam failure detection, for example, based on a pre-defined rule. In an example, the electronic device 110 is served by the first cell 125. When a signal quality or signal qualities of RS(s) in the first cell 125 are worse than respective threshold(s), beam failure can be declared. As described above, partial beam failure can be declared, for example, when a signal quality of a RS corresponding to a serving control channel is worse than a threshold. Alternatively, full beam failure can be declared, for example, when a signal quality corresponding to each serving control channel is worse than a threshold. Alternatively, a beam failure instance (BFI) of the first cell 125 can be declared. In an example, beam failure in the first cell 125 is detected or declared when a number of consecutive BFIs of the first cell 125 is equal to or larger than a threshold, such as a maximum number configured by Radio Resource Control (RRC). Alternatively or additionally, signal(s) from the second cell 126 can be used for BFD in the first cell 125.

The processing circuitry 150 can be configured to identify a new candidate beam used in forming a new link in a failed cell, such as the first cell 125. The new link can be used in communication with the network 101. In an embodiment, the processing circuitry 150 can measure or monitor RS(s) (e.g., an SSB, a periodic CSI-RS) used for beam identification to determine the new candidate beam. The RS(s) correspond to candidate beam(s). The processing circuitry 150 can measure signal qualities, such as RSRP, of the RS(s). Further, the processing circuitry 150 can determine the new candidate beam based on the signal qualities of the candidate beam(s).

The processing circuitry 150 can be configured to implement a BFRQ procedure. The BFRQ procedure can be implemented using various embodiments, as described below.

In an embodiment, the processing circuitry 150 can transmit a BFRQ to the network 101 (e.g., the base station 120) using a contention-free (CF) RACH (or PRACH) based BFRQ procedure (or the CF RACH BFRQ procedure) where a dedicated RACH resource is associated with each candidate beam RS resource. A BFR procedure including the CF RACH BFRQ procedure can be referred to as the CF RACH procedure. For example, a first dedicated RACH resource is associated with a first candidate beam RS resource, a second dedicated RACH resource is associated with a second candidate beam RS resource, an Nth dedicated RACH resource is associated with an Nth candidate beam RS resource, and the like where N is a positive integer. The new candidate beam corresponding to one of the candidate beam RS resources, such as the second candidate beam RS resource, is identified. Accordingly, when the beam failure is detected and the new candidate beam is identified, the processing circuitry 150 can transmit the second dedicated RACH resource associated with the second candidate beam RS resource. When the base station 120 receives the second dedicated RACH resource, the base station 120 can determine that the new candidate beam is the second candidate beam.

In an embodiment, the electronic device 110 is configured with a PCell and multiple SCells. The CF RACH procedure can be applied to the PCell and the multiple SCells. The CF RACH procedure can be referred to as a CF RACH SCell BFR procedure (or a CF RACH SCell BFR) when applied to SCell(s). When the contention-free RACH based scheme described above is applied for the multiple SCells, a relatively large amount of dedicated (or contention-free) RACH resources on the PCell is used and a UL overhead for the PCell can be relatively large. For example, the electronic device 110 is configured with 32 SCells and 64 candidate beams RS resources corresponding to different beam directions are configured for each SCell. Thus, 2048 dedicated RACH resources on the PCell are to be reserved for the 32 SCells.

According to aspects of the disclosure, the processing circuitry 150 can implement a BFRQ procedure where a first signal including a request (e.g., a BFR SR) indicating the beam failure and a second signal (e.g., a BFR report) including cell information and/or new beam information used to recover the beam failure can be sent separately. For example, in two steps to the network 101. Further, the first signal can be configured with a high priority, and thus an UL grant is guaranteed when the network 101 receives the first signal. Accordingly, resources for the second signal are configured with priority scheduling. The BFRQ procedure described above can be referred to as the BFR SR BFRQ procedure, and the BFR procedure including the BFR SR BFRQ procedure can be referred to as the BFR SR procedure. The BFR SR procedure can be applied for a PCell (or a PSCell), an SCell, or the like.

In an example, the electronic device 110 is configured with a plurality of SCells and a PCell and multiple candidate beams can be configured for each SCell and the PCell. The BFR SR procedure can be implemented by the processing circuitry 150 as below. In an embodiment, the processing circuitry 150 can transmit a BFR SR indicating the beam failure, for example, on a PUCCH of the PCell to the network 101 (e.g., the base station 120). The BFR SR can indicate the beam failure of the PCell and/or one or more of the plurality of SCells. In an example, cell information (e.g., one or more cell indices of failed cell(s)), is not transmitted in the BFR SR and thus is unknown to the network 101. A plurality of cells (e.g., the PCell and an SCell) can be configured to serve the electronic device 110. When beam failure is detected on at least one (e.g., the SCell) of the plurality of cells, the processing circuitry 150 can transmit the BFR SR to the network 101 to indicate the beam failure without reporting the cell information of the at least one of the plurality of cells. Thus, whether the SCell and/or the PCell fail is unknown to the network 101. According to an aspect of the disclosure, new beam information is not included in the BFR SR.

The BFR SR can have 1 bit. In an example, the processing circuitry 150 indicates the beam failure, for example, on the first cell 125 using a certain sequence such as a preamble sequence. The preamble sequence can be preconfigured using a sequence-based PUCCH resource that is adapted from a SR configuration used for a SR, such as shown in FIGS. 10, 11A-11D, 12A-12C, 13A-13B, and 14A-14D.

According to aspects of the disclosure, the processing circuitry 150 can send a BFRQ (e.g., a BFR report) to the network 101, and thus report the cell information of the failed cell(s), such as the first cell 125, the corresponding new beam information of the new candidate beam(s), for example, by a payload transmitted on an UL channel. The cell information of the failed cell(S) can include an index or indices of the failed cell(s). The payload and the UL channel can be a MAC CE (e.g., a BFRQ MAC CE) on a PUSCH, UCI (e.g., A-CSI) on a PUCCH, or the like. In an example, the new beam information includes an index of a candidate beam resource corresponding to the new candidate beam. In an example, the new beam information includes indices of candidate beam resources corresponding to the new candidate beams;

When compared with the CF RACH BFRQ procedure, the BFR SR procedure can reduce a UL overhead.

The processing circuitry 150 can be configured to monitor a network response or a BFRR, e.g., to a BFR report or a BFRQ. In an embodiment, after transmitting the BFR report, the processing circuitry 150 monitors downlink for the BFRR. The BFRR can be monitored, for example, within a pre-defined duration. In an example, the processing circuitry 150 receives the BFRR within the pre-defined duration, and thus the BFR is completed. The processing circuitry 150 can determine whether the beam failure recovery is successful based on reception of the e BFRR within the pre-defined duration.

The network response or the BFRR can be transmitted in the failed cell(s) or another cell. In an example, the network response is transmitted in a non-failing cell serving the electronic device 110. When the failed cell, such as the first cell 125, is an SCell, the network response, the BFR SR, and/or the BFR report on the SCell can be transmitted in a PCell or a PSCell that serves the electronic device 110.

In an example, the electronic device 110 is in DC with the base station 120 and another base station. The new beam information can be communicated to the base station 120 via the other base station. Thus, various embodiments of the BFRQ procedure described above can be suitably adapted.

The processing circuitry 150 can be implemented using various techniques, such as integrated circuits, one or more processors executing software instructions, and the like.

The memory 146 can be any suitable device for storing data and instructions to control operations of the electronic device 110. In an example, the memory 146 stores information (e.g., thresholds) and instructions associated with beam failure recovery, and software instructions to be executed by a processor, such as the processing circuitry 150. The memory 146 can store various results including signal qualities.

In an embodiment, the memory 146 can be non-volatile memory, such as read-only memory, flash memory, magnetic computer storage devices, hard disk drives, solid state drives, floppy disks, and magnetic tape, optical discs, and the like. In an embodiment, the memory 146 can be a random access memory (RAM). In an embodiment, the memory 146 can include non-volatile memory and volatile memory.

Figure 2:
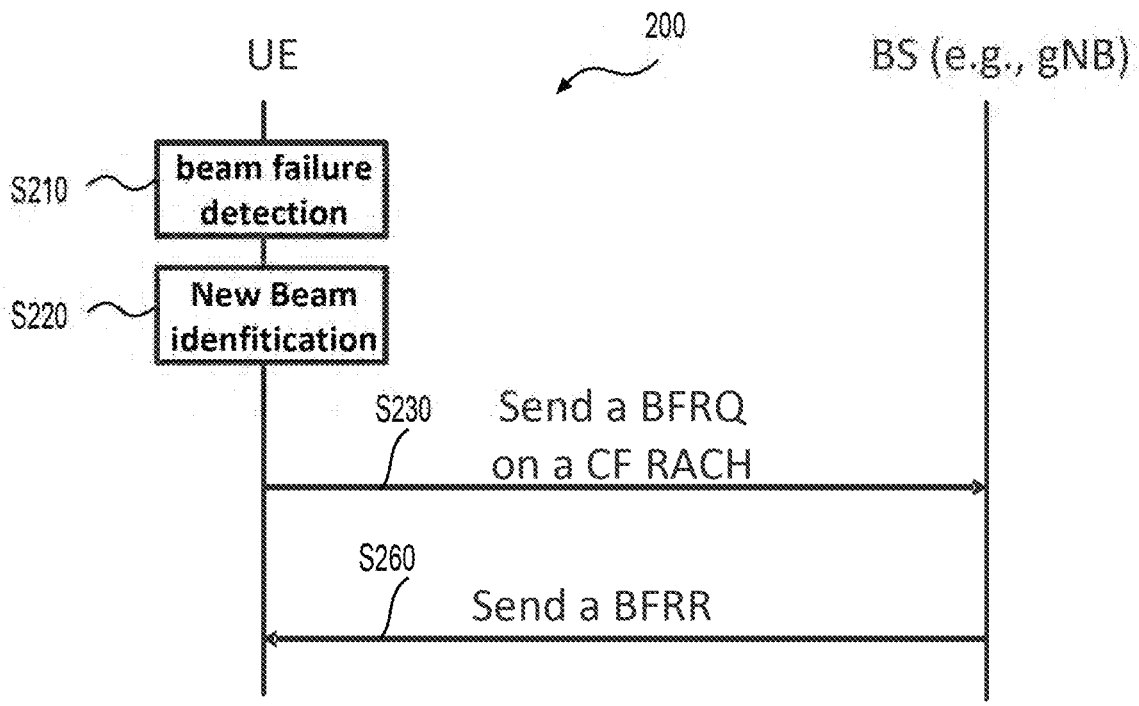
FIG. 2 shows a flow chart of an exemplary process 200 according to an embodiment of the disclosure.

FIG. 2 shows a flowchart of an exemplary process 200 according to an embodiment of the disclosure. The process 200 can be used to implement BFR for a cell, such as a PCell, a PSCell, or the like.

At S210, beam failure on the cell can be detected by a UE, such as the electronic device 110. One or more serving control channels can be configured for the cell. In an example, when each of the one or more serving control channels fails (e.g., when a BLER of each of the one or more serving control channels exceeds a default BLER), the beam failure is declared.

At S220, a new candidate beam can be identified for BFR in the failed cell, for example, by monitoring RS(s) for beam identification, as described above.

At S230, a BFRQ can be sent on a CF RACH to a base station (BS) (e.g., a gNB), as described above. In an embodiment, the BFRQ can indicate the beam failure of the failed cell and the new candidate beam identified in S220.

At S260, a BFRR can be sent from the BS to the UE and received by the UE. It an example, the BFRR is detected within a pre-defined duration, and thus the beam failure recovery is successful based on the reception of the BFRR.

Subsequently, beam switching can be performed to form a new link in the cell. The process 200 is an example of the CF RACH BFRQ procedure.

Figure 3:
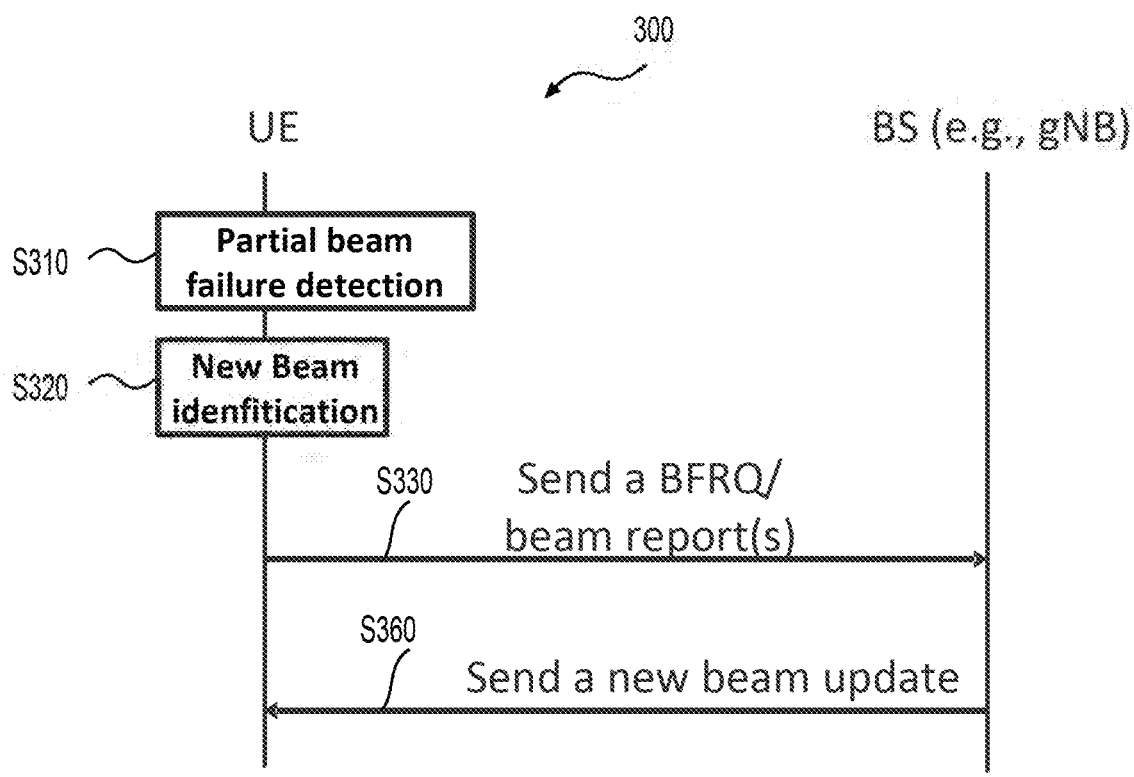
FIG. 3 shows a flow chart of an exemplary process 300 according to an embodiment of the disclosure.

FIG. 3 shows a flowchart of an exemplary process 300 according to an embodiment of the disclosure. The process 300 can be used to implement BFR for a cell, such as a PCell, a PSCell, or the like. In an example, the BFR shown in FIG. 3 is referred to as layer 1 (L1) event triggered BFR.

At S310, partial beam failure on the cell can be detected by a UE, such as the electronic device 110. Multiple serving control channels can be configured for the cell. In an example, when a subset of the multiple serving control channels is determined to have failed, the partial beam failure is declared. As described above, a number of the subset of the multiple serving control channels can be less than a number of the multiple serving control channels.

At S320, a new candidate beam can be identified for BFR in the failed cell, for example, by monitoring RS(s) for beam identification, as described above in S220.

At S330, a BFRQ and/or a beam report can be sent to a BS (e.g., a gNB). In an embodiment, the BFRQ can indicate the beam failure of the failed cell and the beam report can indicate the new candidate beam identified in S320.

At S360, a new beam update can be sent from the BS to the UE and received by the UE. For example, the BS can assign a new beam to the UE based on the new candidate beam and can indicate the new beam in the new beam update.

Figure 4A:
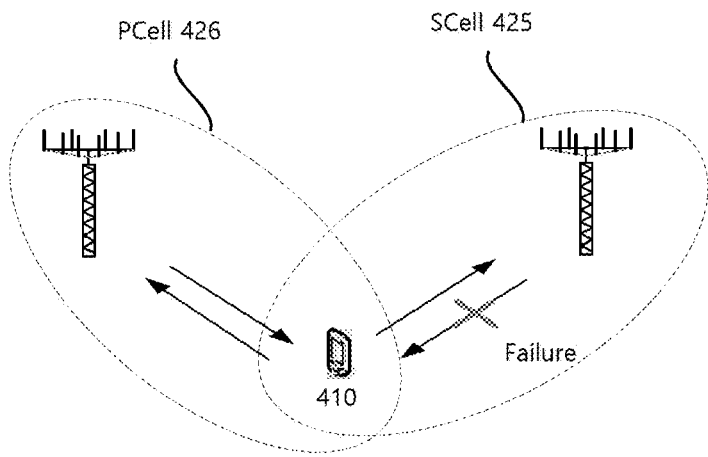
FIGS. 4A-4B show examples of beam failure in an SCell according to embodiments of the disclosure.
Figure 4B:
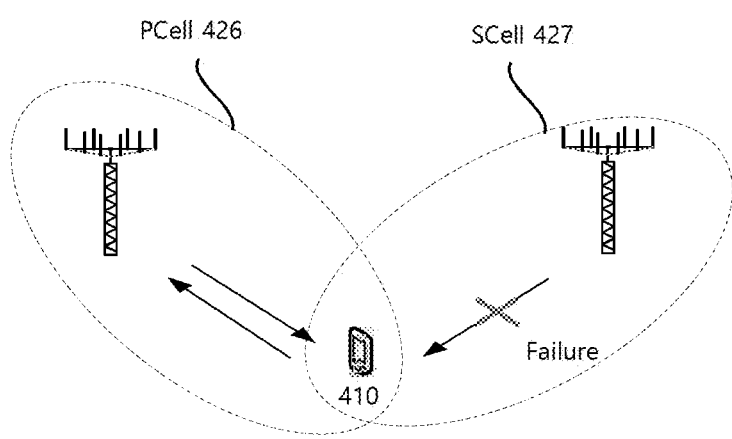

FIGS. 4A-4B show examples of beam failure in an SCell according to embodiments of the disclosure. In FIG. 4A, a UE 410 is configured with a PCell 426 and an SCell 425. The SCell 425 is a DL/UL SCell where the UE 419 can transmit data to and receive data from a network using the SCell 425. In an example, the beam failure can occur in the DL of the SCell 425. A BFRQ or a request indicating the beam failure on the SCell 425 can be sent on the PCell 426 or the SCell 425 when the beam failure occurs in the SCell 425.

In FIG. 4B, the UE 410 is configured with the PCell 426 and an SCell 427. The SCell 427 is a DL-only SCell where the UE 410 can receive data from a network in the DL. In an example, the UE 410 cannot transmit data to the network. The beam failure can occur in the DL of the SCell 427. In an example, a BFRQ or a request indicating the beam failure on the SCell 427 is to be sent on another cell, such as the PCell 426, when the beam failure occurs in the SCell 427.

The PCell 426, the SCell 425, or the SCell 427 can have any suitable carrier frequency, and thus can be in the FR1 or in the FR2. In an example, referring to FIG. 4A, the PCell 426 is in the FR1, the SCell 425 is in the FR2. In an example, referring to FIG. 4B, the PCell 426 is in the FR1, the SCell 427 is in the FR2.

In the CF RACH SCell BFR procedure described above, a BFRQ including new beam information can be sent using a dedicated RACH (or PRACH) resource. Therefore, existing procedures and configuration(s) used for a PCell in the CF RACH BFRQ procedure can be reused for an SCell. As described above, a relatively large amount of dedicated RACH resources on the PCell is to be used and a UL overhead for the PCell can be relatively large. The CF RACH SCell BFR procedure can also lead to a high latency for power ramping up for sending a RACH preamble in a message 1 of a four-step RACH.

In an embodiment, a contention-based (CB) RACH procedure can be used in BFR of an SCell and can be referred to as a CB RACH SCell BFR procedure or CB RACH SCell BFR. Compared with the CF RACH SCell BFR procedure, the CB RACH SCell BFR procedure can use less resources (e.g., only 1 RACH resource is used). However, the CB RACH SCell BFR procedure can result in relatively long latency, for example, due to power ramping up, contention, multiple message exchanges, and the like.

Figure 5:
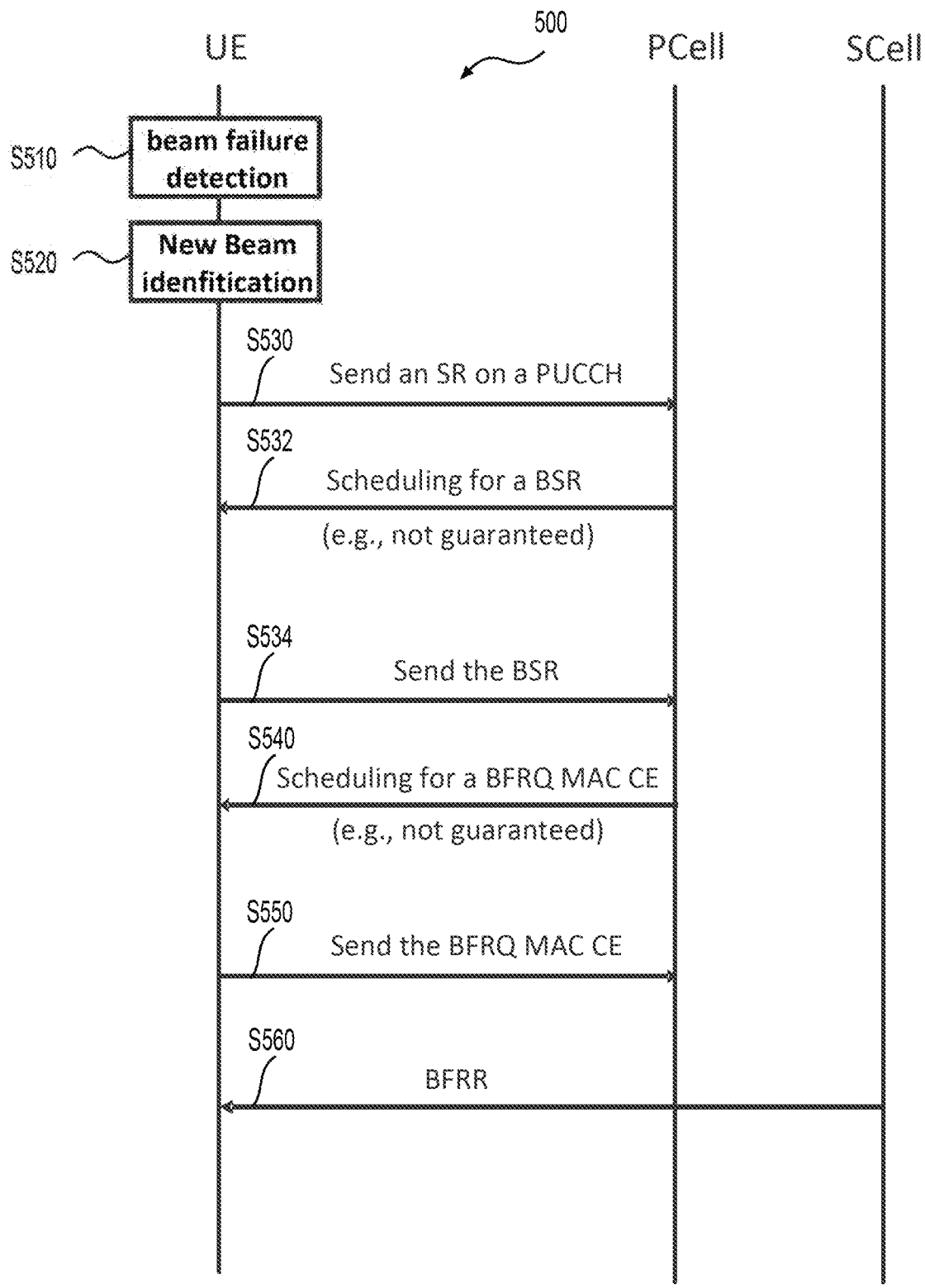

FIG. 5 shows a flowchart of an exemplary process 500 according to an embodiment of the disclosure. The process 500 can be used to implement BFR for a cell, such as an SCell. The description below is given for the SCell.

At S5510, beam failure on the SCell can be detected by a UE.

At S520, a new candidate beam can be identified for beam failure recovery in the failed SCell, for example, by monitoring RS(s) for beam identification, as described above.

At S530, a SR can be seat on a PUCCH configured for a PCell to a BS (e.g., a gNB) to request resources. In an example, 1 bit is used to send the SR. The SR can be sent using the SR configuration described below with reference to FIGS. 10 and 11-11D.

At S532, scheduling for a BSR is sent on the PCell from the BS to the UE. The UE can receive the BSR.

At S534, the UE can send the BSR on the PCell to the BS. The BS can receive the BSR. The BSR can indicate a payload size, and thus the BS can determine a data size to be transmitted, for example, in a BFRQ MAC CE.

At S540, the BS can send scheduling for the BFRQ MAC CE to the UE.

At S550, the UE can send the BFRQ MAC CE to the BS. The BFRQ MAC CE can indicate cell information (e.g., a cell index) of the SCell, new beam information (e.g., a new beam index corresponding to the new candidate beam), and/or the like.

At S560, a BFRR can be sent on the SCell to the UE and received by the UE. In an example, the BFRR is detected within a pre-defined duration, and thus the beam failure recovery is successful based on the reception of the BFRR.

A BFRQ procedure described by steps S530, S532, S534, S540, and S550 can be referred to as a SR SCell BFRQ procedure and the BFR procedure described in the process 500 can be referred to as a SR SCell BFR or a SR SCell BFR procedure.

In an embodiment, in a BFRQ procedure, a PUCCH format, such as PUCCH formats 2, 3, or 4, can be used to send a BFRQ that indicates the beam failure (e.g., beam failure of an SCell), cell information (e.g., of the failed SCell), and/or new beam information. When the BFRQ procedure described above is used for an SCell, the BFRQ procedure can be referred to as a PUCCH formats 2-4 SCell BFRQ procedure and a BFR procedure including the PUCCH formats 2-4 SCell BFRQ procedure can be referred to as a PUCCH formats 2-4 SCell BFR. Accordingly, PUCCH resources are to be reserved. In an example, the PUCCH resources are highly protected and have low coding rate(s), and thus the PUCCH resources to be reserved can be relatively large. The PUCCH formats 2, 3, and 4 can include more than 2 bits. The PUCCH formats 2-4 SCell BFR procedure can have relatively low latency and large resource overhead.

Figure 6:
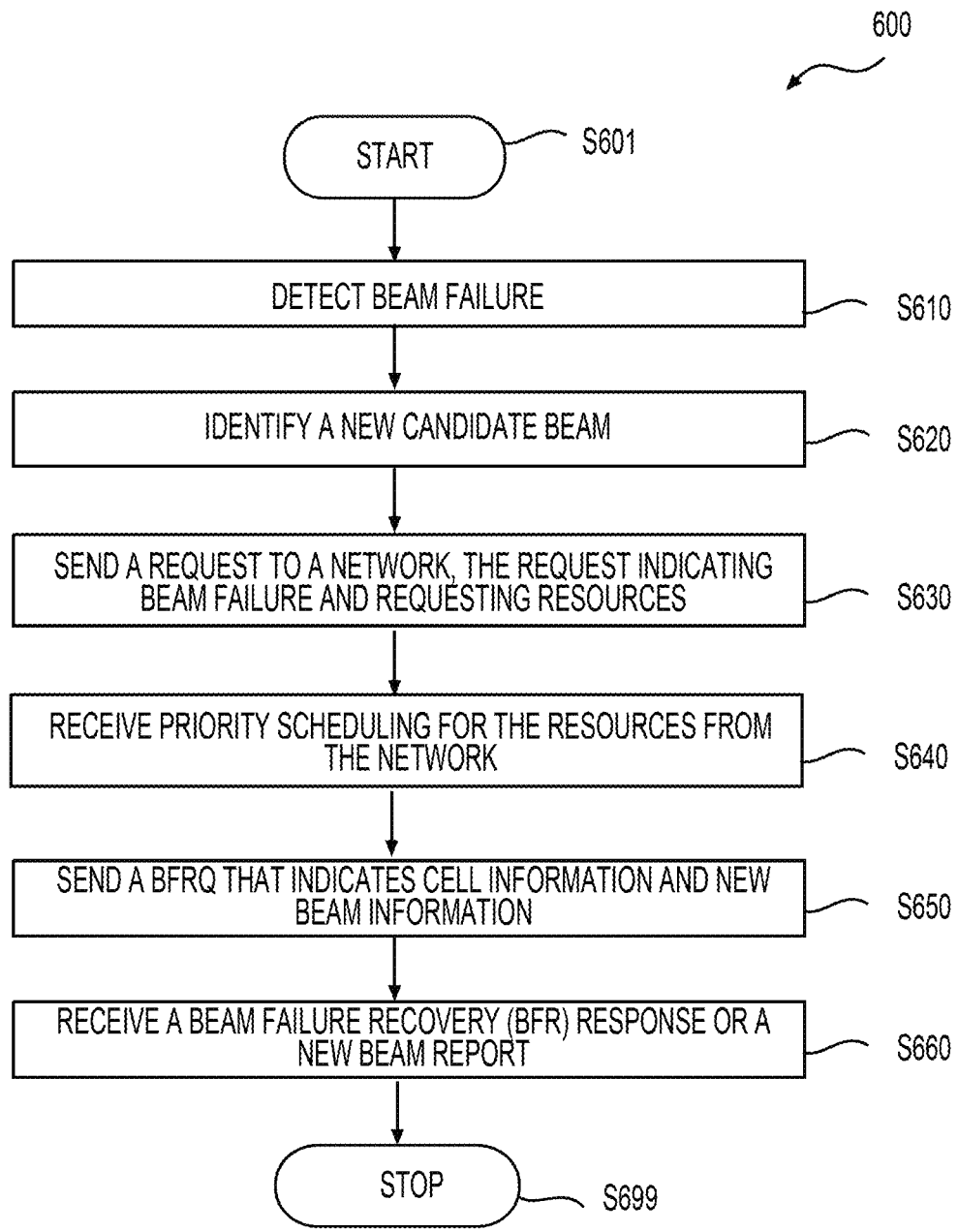

FIG. 6 shows a flowchart of an exemplary process 600 according to an embodiment of the disclosure. The process 600 can be used to implement beam failure recovery for a cell, such as a PCell, a PSCell, or an SCell. In an example, an electronic device, such as the electronic device 110, is configured to perform the process 600. The process 600 starts at S601, and proceeds to S610.

At S610, beam failure on the cell that serves the electronic device can be detected. Signals, such as RSs associated with one or more Tx beams from cell(s) can be measured to obtain signal qualities including RSRP, RSRQ, BLER, and/or the like. Beam failure can be detected based on the signal qualities, as described above with reference to FIG. 1. As described above, the electronic device can be configured with a set of serving control channels in the cell. Beam failure (e.g., full beam failure) can be determined or declared for the cell when the set of serving control channels fails. Alternatively, beam failure (e.g., partial beam failure) can be determined or declared for the cell when a subset of the set of serving control channels fails. In an example, partial beam failure can be declared when the cell is a PCell or a PSCell. The above description can be adapted to detect beam failure on additional cell(s) that serve the electronic device.

At S620, a new candidate beam can be identified for beam failure recovery in the cell (or the failed cell), for example, based on RS(s), as described above.

At S630, beam failure can be indicated to a network (e.g., the network 101) or a base station (e.g., the base station 120) in the network by sending a request to the network. In an example, the base station is a gNB. The request can indicate the beam failure and request resources that can be used to report additional information used in beam recovery, such as cell information of the failed cell, new beam information, and/or the like. As described above, the beam failure can be indicated using a certain sequence; such as a sequence-based PUCCH resource similar or identical to the SR configuration used in sending a SR. In an embodiment, the request is a BFR SR indicating the beam failure and requesting the resources. In an example, a length of the BFR SR is bit. The BFR SR can be sent using a PUCCH, a NR-PUCCH, or the like. In an example, the cell information and the new beam information are not carried in the BFR SR.

In an example, beam failure of one or more cells can be determined at S610, the cell information (e.g., one or more cell indices corresponding to the one or more cells) of the one or more cells is not carried in the BFR SR.

Figure 10:
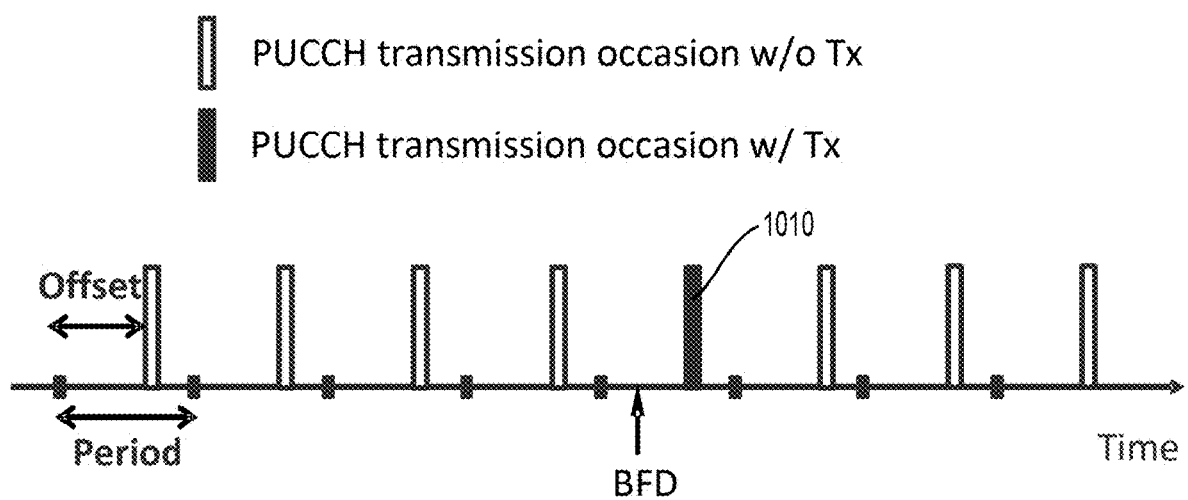
FIG. 10 show an exemplary BFR SR configuration according to an embodiment of the disclosure.

Referring to FIG. 10, similar to a SR configuration, a configuration used for the BFR SR (referred to as a BFR SR configuration) can include a resource identifier (ID) indicating that a PUCCH resource is provided for a PUCCH transmission conveying the BFR SR. The BFR SR configuration can include a period and an offset of a PUCCH transmission occasion using the PUCCH resource. The period indicates a periodicity of the BFR SR configuration. The offset indicates a position of the PUCCH transmission occasion in a time domain. The period of the BFR SR configuration can be identical to or different from a period of the SR configuration. The offset of the BFR SR configuration can be identical to or different from an offset of the SR configuration. The BFR SR configuration can include the period and the offset. The BFR SR configuration can also include the resource ID. In an example, the PUCCH resource is transmitted on a PUCCH transmission occasion 1010 only when a beam failure event (e.g., BFD) occurs on the cell (e.g., the beam failure is detected), as shown in FIG. 10. FIG. 10 can represent the SR configuration by replacing the BFD with an SR event and making the PUCCH transmission occasion 1010 an SR. The PUCCH resource can be transmitted using a sequence-based PUCCH format, such as a PUCCH format 0 (PF0) as described below with reference to FIGS. 1A-I D, 12A-12C, 13A-13B, and 14A-14D.

At S640, priority scheduling for the resources can be received by the electronic device from the network or the base station. The resources can be for a MAC CE used for BFR (referred to as a BFRQ MAC CE) on a PUSCH, an UCI (e.g., A-CSI) on a PUCCH, or the like. The priority scheduling can be guaranteed, for example, due to a high priority of the BFR SR over another SR (e.g., a non-BFR SR).

At S650, a BFR report indicating the cell information (e.g., a cell index) of the cell can be sent to the network, for example, by a payload on an UL channel. The corresponding new beam information (e.g., a new candidate beam index) can also be transmitted in the BFR report. The payload and the UL channel can be the BFR MAC CE on the PUSCH, the UCI on the PUCCH, or the like.

At S660, a BFRR or a new beam report can be received from the network. For example, the electronic device can monitor a PDCCH in a specified search space set for the BFRR, as described with reference to FIG. 1. The process 600 proceeds to S699, and terminates.

Steps in the process 600 can be implemented using any suitable order. S630, S640, and S650 can be implemented when the beam failure is detected. In an example, S630, S640, and S650 are implemented after S610. The process 600 for beam failure recovery can be suitably adapted for various applications and scenarios in communication systems. In an example, the BFRR or the new beam report is detected within a pre-defined duration, and thus the beam failure recovery is successful based on the reception of the BFRR or the new beam report. Subsequently, beam switching can be performed to form a new link in the cell.

The description above can be suitably adapted to a plurality of cells where the BFR procedures can be applied for one or more cells that fail. FIGS. 7A-7B, 8, and 9 show examples of the process 600 being adapted in various scenarios for a PCell, a PSCell, or an SCell.

FIG. 7A shows a flowchart of an exemplary process 700A according to an embodiment of the disclosure. The process 700A can be used to implement beam failure recovery for a cell, such as a PCell, a PSCell, or the like. In an example, the process 700A is referred to as an L1 event triggered BFR. In an example, the cell serves a UE.

At S710A, partial beam failure on the cell can be detected by the UE, as described above, such as with reference in FIG. 1 and S310. Multiple serving control channels can be configured for the cell. In an example, when a subset of the multiple serving control channels fails, the partial beam failure is declared. As described above, a number of the subset of the multiple serving control channels is less than a number of the multiple serving control channels.

At S720A, a new candidate beam can be identified for beam failure recovery in the cell, for example, by monitoring RS(s) for beam identification, as described above, such as with reference in FIG. 1 and S220.

At S730A, a BFR SR on a PUCCH can be sent to a BS (e.g., a gNB) to indicate beam failure and request resources, such as described above with reference to FIGS. 1 and 6. The BFR SR can be sent using the BFR SR configuration described above with reference to FIGS. 6 and 10. A length of the BFR SR can be 1 bit. In an example, cell information and new beam information are not carried in the BFR SR.

At S740A, priority scheduling for the resources can be sent by the BS and received by the UE, as described above with reference to FIGS. 1 and 6. The priority scheduling can be for a BFRQ MAC CE on a PUSCH. The priority scheduling can be guaranteed, for example, due to a high priority of the BFR SR.

The BFRQ MAC CE can indicate cell information (e.g., a cell index) of the cell. The BFRQ MAC CE can include corresponding new beam information (e.g., a new candidate beam index). The BFRQ MAC CE can further include beam measurement(s), such as RSRP(s).

At S750A, the BFRQ MAC CE can be sent to the BS on the PUSCH configured for the cell.

At S760A, a new beam update indicating a new beam can be sent by the BS and received by the UE. For example, the BS can assign the new beam to the UE based on the new beam information.

FIG. 7B shows a flowchart of an exemplary process 700B according to an embodiment of the disclosure. The process 700B can be used to implement beam failure recovery for a cell, such as a PCell, a PSCell, or the like. In an example, the process 700B is referred to as an L1 event triggered BFR. In an example, the cell serves a UE.

At S710B, partial beam failure on the cell can be detected by the UE, as described above in S710A.

At S720B, a new candidate beam can be identified for beam failure recovery in the cell, for example, by monitoring RS(s) for beam identification, as described above in S720A.

At S730B, a BFR SR on a PUCCH configured for the cell can be sent to a BS (e.g., a gNB) to indicate beam failure and request resources, as described above in S730A.

At S740B, scheduling for the resources can be sent by the BS and received by the UE. The resources can be A-CSI on a PUCCH for a beam report. The beam report can indicate or include cell information (e.g., a cell index) of the cell, corresponding new beam information (e.g., a new candidate beam index), and/or the like. In an example, the beam report further includes beam measurement(s), such as RSRP(s).

At S750B, the A-CSI can be sent to the BS on the PUCCH configured for the cell, for example, via L1 reporting.

At S760B, a new beam update indicating a new beam can be received by the UE. The BS can determine the new beam based on the new beam information.

The processes 700A and 700B described above can be suitably adapted. For example, full beam failure can be detected at S710A or S710B.

Figure 8:
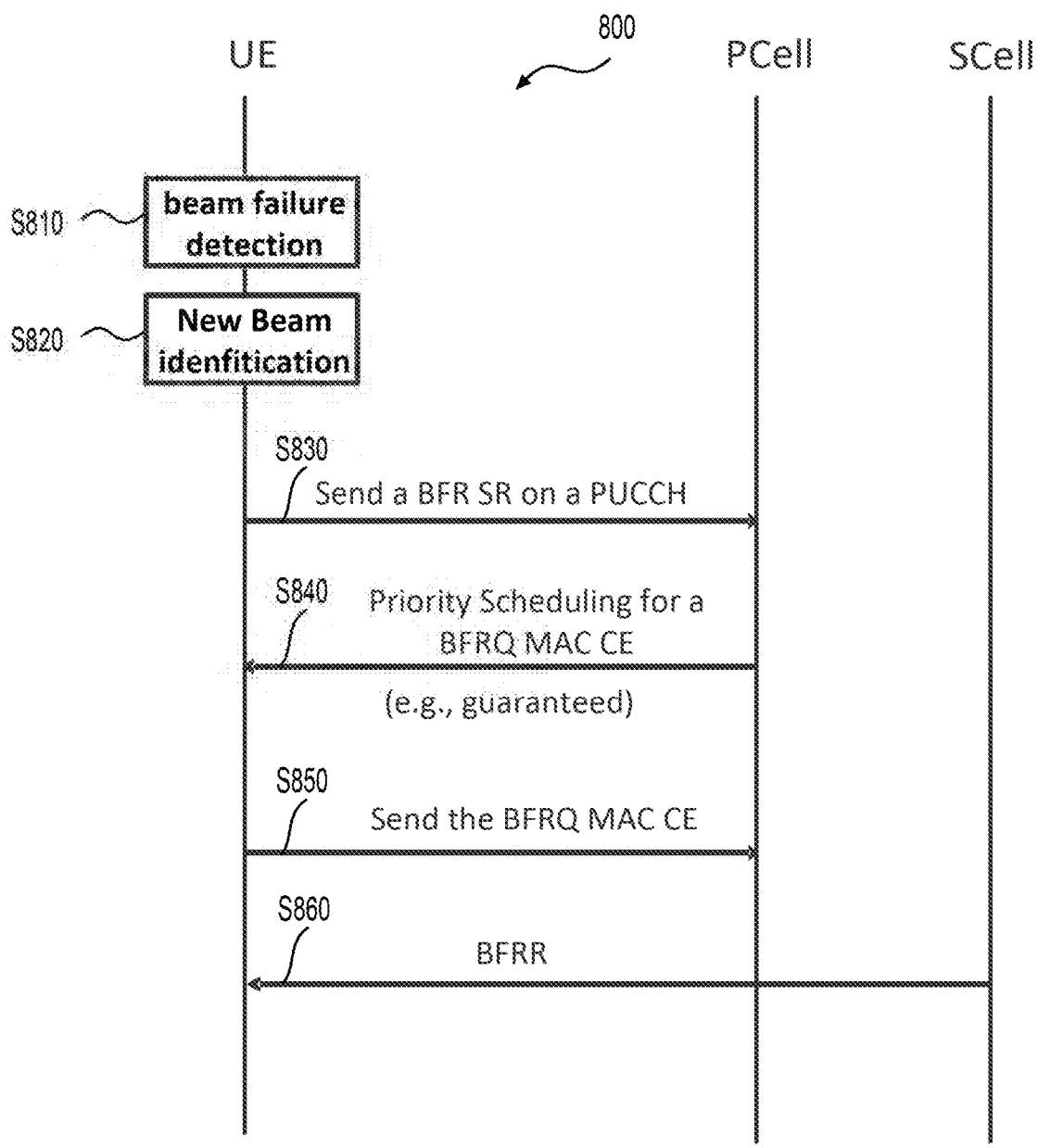

FIG. 8 shows a flowchart of an exemplary process 800 according to an embodiment of the disclosure. The process 800 can be used to implement beam failure recovery for a cell, such as an SCell. In an example, the SCell and a PCell (or a PSCell) serve a UE.

At 810, beam failure on the SCell can be detected by the UE, as described above with reference to FIGS. 1 and 6.

At S820, a new candidate beam can be identified for beam failure recovery in the SCell, for example, by monitoring RS(s) for beam identification, as described above with reference to FIGS. 1 and 6.

At S830, a BFR SR on a PUCCH can be sent from the UE to a BS (e.g., a gNB) to indicate beam failure and request resources (e.g., an UL grant, priority scheduling). In an example, the PUCCH is configured for the PCell. The BFR SR can be sent using the BFR SR configuration, as described above with reference to FIGS. 1 and 10. A length of the BFR SR can be 1 bit. In an example, cell information and new beam information are not carried in the BFR SR, as described above with reference to FIG. 6.

At S840, priority scheduling for the resources can be sent by the BS and received by the UE on the PCell, as described above in S740A. The resources can be a BFRQ MAC CE, for example, on a PUSCH. The priority scheduling can be guaranteed, for example, due to a high priority of the BFR SR.

The BFRQ MAC CE can indicate cell information (e.g., a cell index) of the SCell. The BFRQ MAC CE can include corresponding new beam information (e.g., a new candidate beam index). The BFRQ MAC CE can further include beam measurement(s), such as RSRP(s).

At S850, the BFRQ MAC CE can be sent to the BS on the PUSCH of the PCell, as described above in S750A.

Figure 9:
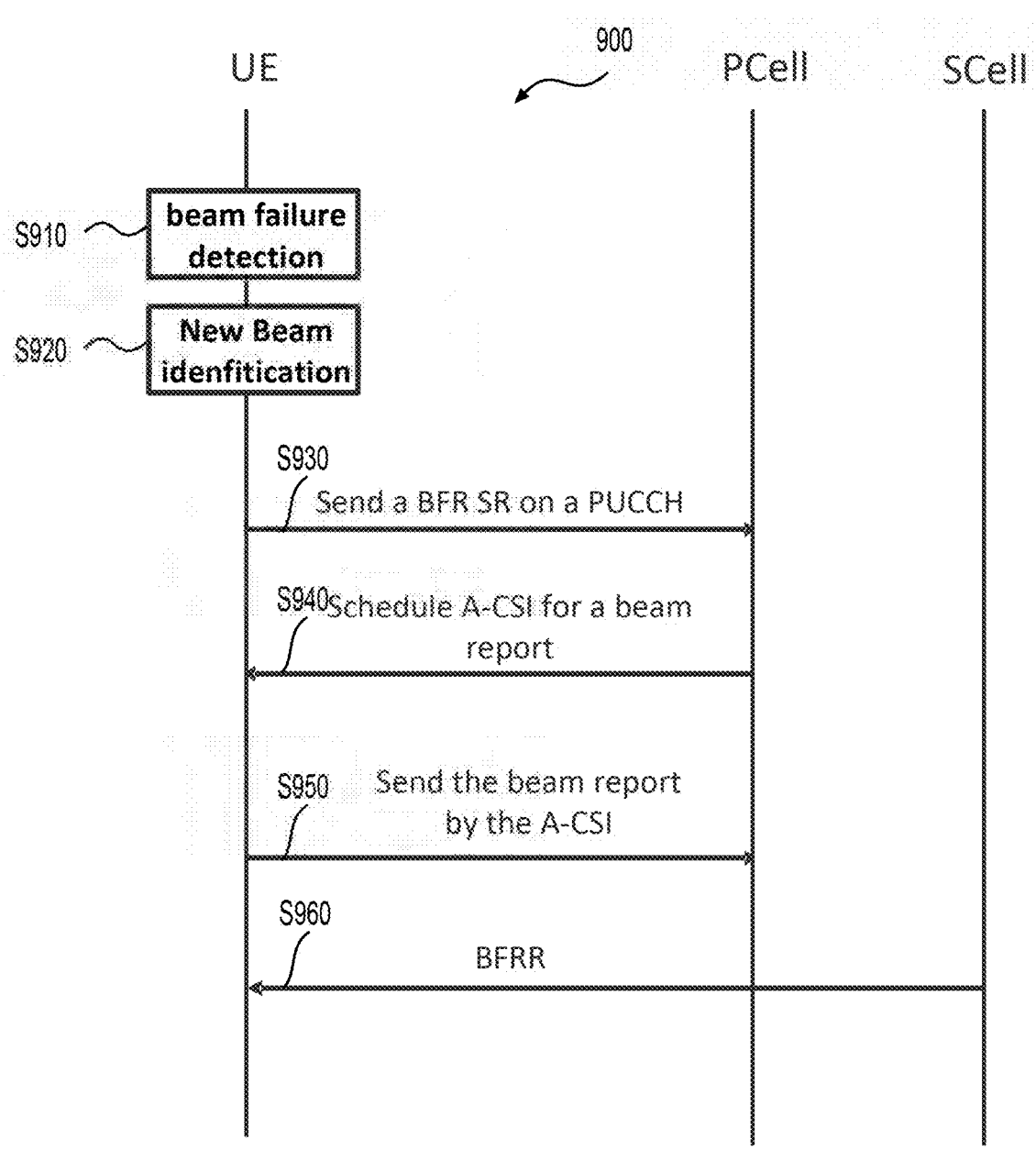

At S860, a BFRR indicating a new beam can be sent by the BS and received by the UE. The BS can determine the new beam based on the new beam information. In an example, the BFRR is sent on a PDCCH or a PDSCH of the SCell using the new beam. In an example, the BFRR is sent on a PDCCH or a PDSCH of the PCell using a new beam configuration or activation FIG. 9 shows a flowchart of an exemplary process 900 according to an embodiment of the disclosure. The process 900 can be used to implement beam failure recovery for a cell, such as an SCell. In an example, the SCell and a PCell (or a PSCell) serve a UE.

At S910, beam failure on the SCell can be detected by the UE, as described in S810.

At S920, a new candidate beam can be identified for beam failure recovery in the SCell, for example, by monitoring RS(s) for beam identification, as described in S820.

At S930, a BFR SR on a PUCCH can be sent by the UE to a BS (e.g., a gNB) to indicate beam failure and request resources (e.g., an UL grant, priority scheduling), as described in S830. In an example, the PUCCH is configured for the PCell. The BFR SR cat be sent using the BFR SR configuration, as described with reference to FIGS. 1 and 10. A length of the BFR SR can be 1 bit. In an example, cell information and new beam information are not carried in the BFR SR.

At S940, scheduling for the resources can be sent by the BS and received by the UE via the PCell. The resources can be A-CSI on a PUCCH of the PCell for a beam report, such as that described in S640. The beam report can indicate or include cell information (e.g., a cell index) of the cell, corresponding new beam information (e.g., a new candidate beam index), and/or the like. In an example, the beam report further includes beam measurement(s), such as RSRP(s). Cell information can include cell indices of multiple cells having beam failure. New Beam information can include new candidate beam indices for the respective multiple cells.

At S950, the A-CSI can be sent by the UE to the BS on the PUCCH configured for the PCell.

At S960, a BFRR indicating a new beam can be sent by the BS and received by the UE. The BS can determine the new beam based on the new beam information. In an example, the BFRR is sent on a PDCCH or a PDSCH of the SCell using the new beam. In an example, the BFRR is sent on a PDCCH or a PDSCH of the PCell using a new beam configuration or activation.

The BFR procedure described in FIG. 6 can be applied for BFR in a PCell, a PSCell or an SCell. FIGS. 7A-7B show examples when the BFR procedure in FIG. 6 is applied to a PCell or a PSCell. FIGS. 8-9 show examples when the BFR procedure in FIG. 6 is applied to an SCell. Thus, FIGS. 6, 8, and 9 include examples of the BFR SR BFRQ procedure.

The electronic device 110 can be served by a plurality of cells. In an embodiment, beam failure can be detected in multiple cells in the plurality of cells. The multiple cells can include a PCell and a plurality of SCells. The BFR procedures described in FIGS. 6, 7A-7B, 8, and 9 can be suitably adapted or combined for the multiple cells.

Referring to FIG. 6, S610 and S620 can be applied to the multiple cells, and thus new candidate beams for the multiple cells can be identified in S620. S630 can remain the same and the request (e.g., the BFR SR) can indicate the beam failure on the multiple cells. S650 can be adapted and the BFR report includes the cell information of the multiple cells and the new beam information corresponding to the multiple cells. At S660, the BFRR or the beam report can include multiple new beams corresponding to the multiple cells. Similarly, adaption can be applied to FIGS. 7A-7B to include BFR for the plurality of SCells. Adaption can also be applied to FIGS. 8-9 to include BFR for the PCell and other SCells.

Alternatively, FIG. 7A can be combined with FIG. 8 for BFR of the PCell and the plurality of SCells. For example, S710A is used for the PCell and S810 is used for the plurality of SCells. S730A and S830 are combined and a single BFR SR can indicates the beam failure for the PCell and the plurality of SCells. S750A and S850 are combined, and a single BFRQ MAC CE is used for the PCell and the plurality of SCells. Similarly, FIG. 7B and FIG. 9 can be combined for BFR of the PCell and the plurality of SCells.

Various BFR procedures for an SCell are compared in Table 1. The BFR procedures include the BFR SR procedure (e.g., shown in FIGS. 6, 8, and 9), the CF RACH SCell BFR, the CB RACH SCell BFR, the SR SCell BFR, and the PUCCH formats 2-4 SCell BFR.

As shown in Table 1, the BFR SR procedure (e.g., shown in FIGS. 6, 8, and 9) can have a low resource overhead. For example, at S630 (or S730A, S7308, S830, S930), the BFR SR (e.g., having a length of 1 bit) indicates beam failure of one or more cells and for one or more beams. Further, no additional resources (e.g., PUCCH resources) are used to send additional information (e.g., cell information and/or new beam information) in the BFR SR. Thus, the resource overhead used in the BFR SR procedure can be low when compared with that in the CF RACH SCell BFR where a relatively large amount of CF RACH resources on the PCell are to be reserved for a plurality of SCells (e.g., 32) and multiple beams (e.g., 64) configured for each SCell. The resource overhead in the BFR SR procedure can be low when compared with that in the PUCCH formats 2-4 SCell BFR since a large amount of resources used in the PUCCH formats 2-4 is not required in the BFR SR procedure.

As shown in Table 1, the BFR SR procedure (e.g., shown in FIGS. 6, 8, and 9) can have a low latency. The BFR SR can have a higher priority than other data to be sent (e.g., non-BFR SRs, other UE data), and thus resources requested by the BFR. SR can be guaranteed due to priority scheduling. Further, steps (e.g., S532 and S534) associated with a BSR in the SR SCell BFR can result in additional latency. Thus, the BFR SR can have a low latency when compared with the SR SCell BFR. There is no contention in the BFR SR procedure when compared with the CB RACH SCell BFR. Further, in an example, unlike the CB RACH SCell BFR and the CF RACH SCell BFR, no power ramping delay occurs in the BFR SR procedure. Thus when compared with the CB RACH SCell BFR, the latency in the BFR SR procedure can

TABLE 1

Comparison of various BFR procedures

| BFR Procedures | Latency | Resource overhead |
| --- | --- | --- |
| BFR SR procedure | Low | Low |
| CF RACH SCell BFR | Low | High |
| CB RACH SCell BFR | High | Low |
| SR SCell BFR | High | Low |
| PUCCH formats 2-4 SCell BFR | Low | High |

FIGS. 11A-11D show an example of PF0 according to an embodiment of the disclosure. PF0 is also referred to as a short PUCCH format. Referring to FIGS. 11A-11B, PF0 can occupy 1 physical resource block (PRB) in a frequency domain. PF0 can transmit 1 or 2 bits (or UCI bits) and can span 1 or 2 orthogonal frequency-division multiplexing (OFDM) symbols (or symbols) in a time domain. In an example, 2 OFDM symbols can be transmitted to enhance coverage.

In an example, sequence selection is the basis for PF0, in an example, a transmitted sequence is generated by a different phase rotation of a same length-12 base sequence, and thus the phase rotation applied to the base sequence carries the information, such as beam failure, to be transmitted. Twelve different phase rotations can be defined for the same base sequence, providing up to 12 different orthogonal sequences from each base sequence. A linear phase rotation in the frequency domain is equivalent to applying a cyclic shift (CS) in the time domain, as shown in FIG. 11C. In an example shown in FIG. 11D, 30 length-12 sequences with low cross-correlation can be chosen, and thus can be used in 30 different cells, for example, including a plurality of SCells, to maintain a low inter-cell interference. In an example, a phase rotation applied to a certain OFDM symbol also depends on a reference rotation where the reference rotation enables multiplexing multiple electronic devices on a same time-frequency resource. In an example, 12 electronic devices can be multiplexed using the 12 CSs indicated in FIG. 11B.

In an embodiment, UCI transmission can be implemented by the sequence selection. In an example, when a certain sequence is given, the presence of the certain sequence indicates the BFD or BFR SR transmission and the absence of the certain sequence indicates no BFR SR transmission. In an example, an initial CS can be used to define a sequence associated with a PUCCH resource.

UCI can include various elements, such as HARQ(s) (e.g., ACK/NACK), a SR, a BFR SR, CSI, and/or the like. One or more elements can be transmitted individually or can be combined and transmitted together. UCI can be carried by an UL channel, such as a PUCCH, a PUSCH, or the like. Various PUCCH formats (e.g., the PUCCH formats 0 to 4) can be used for the UCI elements. In general, for a PUCCH format (e.g., PF0), a CS, a symbol, an offset, a period, and/or the like can be used to represent a UCI element or a combination of UCI elements. Accordingly, different CSs, symbols, offsets, period(s), and/or the like can be used to represent different UCI elements or different combinations of UCI elements, as described below in FIGS. 12A-12C, 13A-13B, and 14A-14D using PF0 as an example.

In an example, the BFR SR configuration for sending a BFR SR can be different from the SR configuration for sending a SR.

In an example, a period and an offset of the SR configuration and a period and an offset of the BFR SR configuration can be configured separately and can have different values. An existing structure of the SR configuration can be reused for the BFR SR configuration. Existing RRC configuration structure for a SR can be reused for a BFR SR. Separate resources (e.g., a PRB, a CS) can be used for sending a SR and a BFR SR.

Figure 12A:
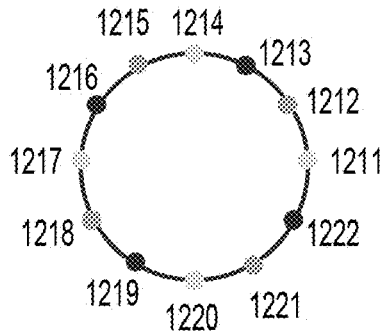
FIGS. 12A-12C show examples of BFR SR configurations according to embodiments of the disclosure.
Figure 12B:
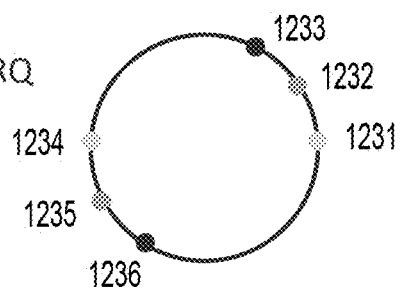
Figure 12C:

FIGS. 12A-12C show examples of BFR SR configurations according to embodiments of the disclosure. FIG. 12A shows an example for 2 HARQ bits. 12 CSs 1211-1222 of PF0 can represent 12 different combinations of the UCI elements. Three kinds of combinations are available including 1) HARQ-only without a SR and a BFR SR; 2) a SR with HARQ; and 3) a BFR SR with HARQ. The HARQ-only can include 4 different combinations: ACK and ACK (e.g., the CS 1211); NACK and ACK (e.g., the CS 1214); NACK and NACK (e.g., the CS 1217); and ACK and NACK (e.g., the CS 1220). The SR with HARQ can include 4 different combinations: SR, ACK, and ACK (e.g., the CS 1212); SR, NACK, and ACK (e.g., the CS 1215); SR, NACK, and NACK (e.g., the CS 1218); and SR, ACK, and NACK (e.g., the CS 1221). The BFR SR with HARQ can include 4 different combinations: BFR SR, ACK, and ACK (e.g., the CS 1213); BFR SR, NACK, and ACK (e.g., the CS 1216); BFR SR, NACK, and NACK (e.g., the CS 1219); and BFR SR, ACK, and NACK (e.g., the CS 1222). Accordingly, when beam failure is detected, one (e.g., the CS 1213) of the CSs 1213, 1216, 1219, and 1222 can be used to send a BFR SR on a PUCCH, for example, in S630, S730A, S730B, S830, S930, or the like. In an example, when a BS receives the CS 1213, the BS determines that beam failure occurs.

FIG. 12B shows an example for 1 HARQ bit. 6 CSs 1231-1236 of PF0 can represent 6 different combinations of the UCI elements. The HARQ-only can include 2 different combinations: ACK (e.g., the CS 1231) and NACK (e.g., the CS 1234). The SR with HARQ can include 2 different combinations: SR and ACK (e.g., the CS 1232); and SR and NACK (e.g., the CS 1235). The BFR SR with HARQ can include 2 different combinations: BFR SR and ACK (e.g., the CS 1233); and BFR SR and NACK (e.g., the CS 1236). Accordingly, when beam failure is detected, one of the CSs 1233 and 1236 can be used to send a BFR SR on a PUCCH, for example, in S630, S730A, S730B, S830, S930, or the like. In an example, when a BS receives the CS 1233, the BS determines that beam failure occurs.

In an example, remaining 6 CSs of PF0 can be used to represent 6 different combinations of the UCI elements of another electronic device. Accordingly, 2 electronic devices or UEs can be multiplexed using the example shown in FIG. 12B. In general, a number of electronic devices that can be multiplexed can be dependent on a number of CSs for a PUCCH format.

FIG. 12C shows an example without HARQ. An SR can be sent using a CS 1241. A BFR SR can be sent using a CS 1242. Accordingly, when beam failure is detected, the CS 1242 can be used to send a BFR SR on a PUCCH, for example, in S630, S730A, S730B, S830, S930, or the like. In an example, remaining 10 CSs of PF0 can be assigned to 5 other electronic devices. Accordingly, 6 electronic devices or UEs can be multiplexed using the example shown in FIG. 12C.

FIGS. 12A-12C show examples where an existing structure of the SR configuration can be reused for the BFR SR configuration, and separate resources, such as different CSs, can be used for sending UCI elements or combinations of UCI elements. 12 CSs of a PF0 are used as an example to illustrate that a SR transmission and a BFR SR transmission can be implemented by the sequence selection, for example, by using different CSs. In an example, when a certain sequence (e.g., the CS 1213 in FIG. 12A) is given, the presence of the certain sequence indicates the BFR SR transmission and the absence of the certain sequence indicates no BFR SR transmission. Of course, any suitable PUCCH format with any suitable number of sequences (e.g., CSs) can be used for the BFR SR.

FIGS. 13A-13B show an example where PF0 has 2 symbols. A first symbol (e.g., a symbol N) is used for a SR and a second symbol (e.g., a symbol N−1) is used for a BFR SR. Referring to FIG. 13A, 8 CSs 1311-1318 of PF0 can represent 8 different combinations of the UCI elements. The HARQ-only can include 4 different combinations: ACK and ACK (e.g., the CS 1311); NACK and ACK (e.g., the CS 1313); NACK and NACK (e.g., the CS 1315); and ACK and NACK (e.g., the CS 1317). The SR with HARQ can include 4 different combinations: SR, ACK, and ACK (e.g., the CS 1312); SR, NACK, and ACK (e.g., the CS 1314); SR, NACK, and NACK (e.g., the CS 1316); and SR, ACK, and NACK (e.g., the CS 1318).

Referring to FIG. 13B, 8 CSs 1321-1328 of PF0 can represent 8 different combinations of the UCI elements. The HARQ-only can include 4 different combinations: ACK and ACK (e.g., the CS 1321); NACK and ACK (e.g., the CS 1323); NACK and NACK (e.g., the CS 1325); and ACK and NACK (e.g., the CS 1327). The BFR SR with HARQ can include 4 different combinations: BFR SR, ACK, and ACK (e.g., the CS 1322); BFR SR, NACK, and ACK (e.g., the CS 1324); BFR SR, NACK, and NACK (e.g., the CS 0.1326); and BFR SR, ACK, and NACK (e.g., the CS 1328). Accordingly, when beam failure is detected, one of the CSs 1322, 1324, 1326, and 1328 can be used to send a BFR SR on a PUCCH, for example, in S630, S730A, S730B, S830, S930, or the like. As shown in FIGS. 13A-13B, an SR configuration shown in FIG. 13A can be reused for the BFR SR configuration except that the BFR SR is sent in a different symbol. Thus, the same configuration is shared by the SR and the BFR SR.

FIGS. 13A-13B show an example for 2 HARQ bits, and the descriptions can be suitably adapted for 1 HARQ bit or 0 HARQ bit (i.e., without HARQ).

Referring to FIGS. 14A-14D, a BFR SR can be transmitted using a SR configuration except that the BFR SR has a different offset (referred to as a BFR offset). Referring to FIG. 14A, 8 CSs 1411-1418 of PF0 can represent 8 different combinations of the UCI elements. The HARQ-only can include 4 different combinations; ACK and ACK (e.g., the CS 1411); NACK and ACK (e.g., the CS 1413); NACK and NACK (e.g., the CS 1415); and ACK and NACK (e.g., the CS 1417). The SR with HARQ can include 4 different combinations: SR, ACK, and ACK (e.g., the CS 1412); SR, NACK, and ACK (e.g., the CS 1414); SR, NACK, and NACK (e.g., the CS 1416); and SR, ACK, and NACK (e.g., the CS 1418).

Referring to FIG. 14B, 8 CSs 1421-1428 of PF0 can represent 8 different combinations of the UCI elements. The HARQ-only can include 4 different combinations: ACK and ACK (e.g., the CS 1421); NACK and ACK (e.g., the CS 1423); NACK and NACK (e.g., the CS 1425); and ACK and NACK (e.g., the CS 1427). The BFR SR with HARQ can include 4 different combinations: BFR SR, ACK, and ACK (e.g., the CS 1422); BFR SR, NACK, and ACK (e.g., the CS 1424); BFR SR, NACK, and NACK (e.g., the CS 1426); and BFR SR, ACK, and NACK (e.g., the CS 1428). Accordingly, when beam failure is detected, one of the CSs 1422, 1424, 1426, and 1428 can be used to send a BFR SR on a PUCCH, for example, in S630, S730A, S730B, S830, S930, or the like. As shown in FIGS. 14A-14B, an SR configuration shown in FIG. 14A can be reused for the BFR SR except that the BFR SR is sent with the BFR offset, for example, a shift between the BFR offset and an SR offset is O slot(s) where O is an integer. As shown in FIGS. 14A-148, the SR configuration shown in FIG. 14A can be reused for the BFR SR except that the BFR SR is sent with a different offset. Thus, the BFR SR transmission shares an existing structure with the SR transmission using the SR configuration. Resources are mapped, for example, the CSs 1411-1418 are mapped into the CSs 1421-1428.

As shown in FIGS. 14A and 14C, a period of the SR configuration is 2P slots where P is a positive integer. The BFR SR configuration can have an identical period: 2P slots, as seen in FIGS. 14B and 14D. FIGS. 14A-14D) show an example for 2 HARQ bits, and the descriptions can be suitably adapted for 1 HARQ bit or 0 HARQ bit (i.e., without HARQ).

A BFR SR configuration can be used for one or more cells, such as one or more SCells. The electronic device 110 can be configured with a plurality of cells or component carriers (CCs), such as CC1-CC9. In an embodiment, multiple BFR SR configurations can be used for the plurality of cells. For example, a first BFR SR configuration is used for the CC1-CC8, and a second BFR SR configuration is used for the CC9. Thus, when one or more of the CC1-CC8 fail, a BFR SR is sent using the first BFR SR configuration. When the CC9 fails, a BFR SR is sent using the second BFR SR configuration.

In an example, a BFR SR configuration (e.g. the first BFR SR configuration) is only used for one cell (e.g., the CC1).

In an example, a BFR SR configuration (e.g., the first BFR SR configuration) is used for each of the plurality of cells (e.g., the CC1-CC9) configured for the electronic device 110.

Collision rules can be applied to handle a collision between a BFR SR and another signal to be transmitted, such as another request, an SR, or the like. The description below uses an SR as an example. In an embodiment, a collision can occur when a BFR SR and an SR are scheduled to be transmitted at a same time or a scheduled BFR SR and a scheduled SR overlaps in time. Referring to FIGS. 14A-14B, when O slots are set to 0, the collision can occur where the BFR SR and the SR overlap in time. In an example, when the collision occurs between the BFR SR and the SR, the BFR SR has a higher priority than the SR, and thus the BFR SR is transmitted prior to the SR transmission. Subsequently, the SR can be transmitted, for example, at a next opportunity (e.g., in a next period). Alternatively, the SR is suspended or discarded. In an example, the BFR SR and the SR are transmitted simultaneously, for example, when adequate resources are allocated for both the BFR SR and the SR. The description can be suitably adapted when the other signal is different from the SR.

As described above, the BFRQ MAC CE can indicate cell information and new beam information. The cell information can include one or more cell indices of failed cell(s). The new beam information can include one or more new candidate beam indices of respective one or more new candidate beams. The BFRQ MAC CE can further indicate beam measurement(s), such as RSRP(s) used in beam reporting. The BFRQ MAC CE can further indicate (e.g., via bit) whether the electronic device 110 can identify a new candidate beam that satisfies a minimum RSRP condition, and thus facilitate a BS (e.g., a gNB) to deactivate an SCell. For example, when an SCell fails and no new candidate beam can be identified for the failed SCell, the gNB can deactivate the failed SCell.

FIGS. 15A-15D show examples of BFRQ MAC CE formats 1510-1513, respectively, according to embodiments of the disclosure. The BFRQ MAC CE formats 1510-1513 are illustrated using respective BFRQ MAC CEs 1510A-1513A. The BFRQ MAC CE formats 1510-1513 can include various fields, such as '$C_N$', 'R', 'E', 'NBI', 'RSRP', and/or the like that indicate cell information, new beam information, beam measurement(s), and/or the like. N can be an integer and indicate a cell number or a cell index. In an embodiment, $C_N$ indicates whether new beam information is available for an Nth cell in the respective BFRQ MAC CE. The Nth cell can be a PCell, a PSCell, or an SCell. 1 bit can be used for $C_N$. For example, $C_N$ being 1 indicates that the Nth cell fails (or the Nth cell is determined to have failed), and the new beam information is available for the Nth cell. $C_N$ being 0 indicates that the new beam information is not available for the Nth cell. In an example, $C_N$ being 0 indicates that the Nth cell can be deactivated or no beam failure is detected for the Nth cell.

'R' can represent a field that is reserved or a reserved field. In an example, 1 bit is used for 'R' and 'R' is set to 0. 'NBI' can represent the new beam information (e.g., the new candidate beam index) corresponding to a cell (e.g., a cell i, a cell j, or a cell k shown in FIGS. 15A-15D) that fails. 'E' can indicate whether a corresponding beam measurement (e.g., RSRP) is available in the respective BFRQ MAC CE. In an example, 1 bit is used for 'E'. 'E' being 0 indicates that the corresponding RSRP is not available in the respective BFRQ MAC CE. 'E' being 1 indicates that the corresponding RSRP is available in the respective BFRQ MAC CE, for example, following the respective new candidate beam index.

In an embodiment, a BFRQ MAC CE format, such as one of the BFRQ MAC CE formats 1510-1513 can have a variable size. In an example, a BFRQ MAC CE format can include an ascending order based on, for example, serving cell indices, new beam indices, and/or the like. Thus, the new beam information and/or the beam measurement(s) can be arranged in the ascending order. Referring to FIGS. 15A-15D, i is less than j and j is less than k. In general, any suitable order can be used in a BFRQ MAC CE format. The order can be an ascending order a descending order, or the like. The various fields in a BFRQ MAC CE format can be suitably modified, added, removed, combined, or the like for different scenarios.

In an embodiment, the electronic device 110 can be configured with a PCell (or a PSCell) having a cell index 0 and SCells: having cell indices 1-31. In some examples, cell information of the PCell is excluded from a BFRQ MAC CE (e.g., 1510A, 1511A), such as shown in FIGS. 15A-15B. In some examples, the cell information of the PCell is included in a BFRQ MAC CE (e.g., 1512A, 1513A), such as shown in FIGS. 15C-15D.

Referring to FIG. 15A, the BFRQ MAC CE 1510 includes fields C1-C31 for the SCells 1-31. 'R' 1521 is reserved. In an example, beam failure of the SCells i, j, and k are detected and new candidate beams are identified for the SCells i, j, and k, respectively. i, j, k are integers larger than 0 and smaller than 32, and i, j, and k are in an ascending order where j is larger than i and smaller than k. Fields 'NBI' for serving cells (or the SCells) i, j, and k can include new candidate beam indices for the SCells i, j, and k, respectively. Fields 'E' 1523-1525 can indicate whether RSRPs follow the respective fields 'NBI' for the SCells i, j, and k. For example, when 'E' 1523 is 1, the RSRP i follows the NBI for the SCell i. When 'E' 1523 is 0, the RSRP i does not follow the NBI for the SCell i and can be excluded from the BFRQ MAC CE 1510.

FIG. 15B includes identical fields as those in FIG. 15A except that fields 'E' and 'RSRP' are excluded. Beam measurements are excluded from the BFRQ MAC CE format 1511. Thus, the BFRQ MAC CE format 1511 is more compact than the BFRQ MAC CE format 1510 and can save resources.

FIG. 15C includes identical fields as those in FIG. 15A except the following differences. 'R' 1521 in FIG. 15A is replaced by a field $C_0$ in FIG. 15C for the PCell Q. In an example, C0 being I indicates beam failure in the PCell 0 and a NBI field is present in the BFRQ MAC CE 1512. In addition, i is an integer larger than or equal to 0. In an example, partial beam failure is declared for the PCell 0, a BFRQ MAC CE having a same format as the BFRQ MAC CE format 1512 can be used to indicate the partial beam failure. The BFRQ MAC CE can have a different logical channel ID (LCID). In an example, an additional field can be included in the BFRQ MAC CE format 1512. The additional field can indicate the partial beam failure. In an example, a BFRQ MAC CE indicates the partial beam failure and includes RSRP(s). When a network (e.g., the network 101, the base station 120) receives the BFRQ MAC CE, the network can update a beam table previously reported by an electronic device (e.g., the electronic device 110) when the received RSRP(s) are larger than corresponding RSRP(s) in the beam table.

FIG. 15D includes identical fields as those in FIG. 15C except that fields 'E' and 'RSRP' are excluded. Beam measurements are excluded from the BFRQ MAC CE format 1512. Thus, the BFRQ MAC CE format 1513 is more compact than the BFRQ MAC CE format 1512 and can save resources.

As described above, the A-CSI can indicate cell information and new beam information. The cell information can include one or more cell indices of failed cell(s). The new beam information can include one or more new candidate beam indices of respective one or more new candidate beams. The A-CSI can further indicate beam measurement (s), such as RSRP(s) used in beam reporting. The A-CSI can further indicate (e.g., via 1 bit) whether the electronic device 110 can identify a new candidate beam that satisfies a minimum RSRP condition, and thus facilitate a BS (e.g., a gNB) to deactivate an SCell. For example, when an SCell fails and no new candidate beam can be identified for the failed SCell, the gNB can deactivate the failed SCell.

The various circuitry, circuits, components, modules, and the like in the present disclosure can be implemented using any suitable technology, such as an integrated circuit (IC). ICs, digital signal processors (DSPs), microprocessors, CPUs, field programmable gate arrays (FPGAs). Application-specific integrated circuits (ASICs), and the like. In an example, the various circuitry, components, modules, and the like can also include one or more processing circuits executing software instructions.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for beam failure recovery (BFR), comprising:
   when beam failure is determined to occur on a secondary cell (SCell) in a plurality of cells configured for an electronic device,
      sending a BFR scheduling request (SR) to a network using a Physical Uplink Control Channel (PUCCH) configured for a primary cell (PCell) in the plurality of cells, the BFR SR indicating the beam failure and requesting resources to report the beam failure;
      receiving priority scheduling for the resources from the network using a channel configured for the PCell, the resources including aperiodic channel-state information (A-CSI) that indicates a cell index of the SCell and a new beam index for a new candidate beam for the SCell;
      sending a BFR request (BFRQ) using the resources by sending the A-CSI on a PUCCH configured for the PCell, the BFRQ indicating the cell index of the SCell and the new beam index of the new candidate beam for the SCell; and receiving a BFR response (BFRR) from the network.

2. The method according to claim 1, wherein
the plurality of cells further includes another SCell; and
when beam failure is determined to occur on the other SCell, the method further includes:
sending another BFR SR to the network using the PUCCH configured for the PCell;
receiving priority scheduling for a BFRQ Medium Access Control (MAC) control element (CE) that indicates a cell index of the other SCell and another new beam index for a new candidate beam for the other SCell;
sending another BFRQ by sending the BFRQ MAC CE using a PUSCH configured for the PCell, the other BFRQ indicating the cell index of the other SCell and the other new beam index of the new candidate beam for the other SCell; and
receiving another BFRR from the network.

3. The method according to claim 1, wherein
the BFR SR has a BFR SR configuration including a period and an offset.

4. The method according to claim 3, wherein
the BFR SR configuration is associated with a PUCCH format 0 that includes multiple cyclic shifts, one or more of the multiple cyclic shifts being configured for at least one of: 1) the BFR SR and 2) the BFR SR and at least one of hybrid automatic repeat requests (HARQs).

5. The method according to claim 3, wherein sending the BFR SR further comprises:
when the BFR SR is scheduled at a same time with a SR, sending the BFR SR prior to sending the SR or sending the BFR SR and the SR simultaneously.

6. The method according to claim 3, wherein
the plurality of cells includes a first subset of cells and a second subset of cells;
the BFR SR configuration is configured for the first subset of cells to report a beam failure for the first subset of cells, the first subset of cells including the SCell; and
another BFR SR configuration is configured for the second subset of cells to report a beam failure for the second subset of cells.

7. A method for beam failure recovery (BFR), comprising:
determining that beam failure occurs on a primary cell (PCell) when at least one of one or more serving control channels fails, the PCell being included in a plurality of cells configured for an electronic device and being configured with the one or more serving control channels to communicate with a network; and
when the beam failure is determined to occur on the PCell,
sending a BFR scheduling request (SR) to the network using a Physical Uplink Control Channel (PUCCH) configured for the PCell, the BFR SR indicating the beam failure and requesting resources to report the beam failure;
receiving priority scheduling for the resources from the network using a channel configured for the PCell, the resources including a BFR request (BFRQ) Medium Access Control (MAC) control element (CE) that indicates a cell index of the PCell and a new beam index for a new candidate beam for the PCell;
sending a BFRQ using the resources to the network by sending the BFRQ MAC CE using a PUSCH configured for the PCell, the BFRQ indicating the cell index of the PCell and the new beam index of the new candidate beam for the PCell; and
receiving a new beam update from the network.

8. The method according to claim 7, wherein
the BFR SR has a BFR SR configuration including a period and an offset.

9. The method according to claim 8, wherein
the BFR SR configuration is associated with a PUCCH format 0 that includes multiple cyclic shifts, one or more of the multiple cyclic shifts being configured for at least one of: 1) the BFR SR and 2) the BFR SR and at least one of hybrid automatic repeat requests (HARQs).

10. The method according to claim 8, wherein sending the BFR SR further comprises:
when the BFR SR is scheduled at a same time with a SR, sending the BFR SR prior to sending the SR or sending the BFR SR and the SR simultaneously.

11. The method according to claim 8, wherein
the plurality of cells includes a first subset of cells and a second subset of cells;
the BFR SR configuration is configured for the first subset of cells to report a beam failure for the first subset of cells, the first subset of cells including the PCell; and
another BFR SR configuration is configured for the second subset of cells to report a beam failure for the second subset of cells.

12. An electronic device for beam failure recovery (BFR), comprising processing circuitry configured to:
when beam failure is determined to occur on a secondary cell (SCell) in a plurality of cells configured for the electronic device,
send a BFR scheduling request (SR) to a network using a Physical Uplink Control Channel (PUCCH) configured for a primary cell (PCell) in the plurality of cells, the BFR SR indicating the beam failure and requesting resources to report the beam failure;
receive priority scheduling for the resources from the network using a channel configured for the PCell, the resources including aperiodic channel-state information (A-CSI) that indicates a cell index of the SCell and a new beam index for a new candidate beam for the SCell;
send a BFR request (BFRQ) using the resources by sending the A-CSI on a PUCCH configured for the PCell, the BFRQ indicating the cell index of the SCell and the new beam index of the new candidate beam for the SCell; and
receiving a BFR response (BFRR) from the network.

13. The electronic device according to claim 12, wherein
the plurality of cells further includes another SCell; and
the processing circuitry is configured to:
when beam failure is determined to occur on the other SCell,
send another BFR SR to the network using the PUCCH configured for the PCell;
receive priority scheduling for a BFRQ Medium Access Control (MAC) control element (CE) that indicates a cell index of the other SCell and another new beam index for a new candidate beam for the other SCell;
send another BFRQ by sending the BFRQ MAC CE using a PUSCH configured for the PCell, the other BFRQ indicating the cell index of the other SCell and the other new beam index of the new candidate beam for the other SCell; and
receive another BFRR from the network.

14. The electronic device according to claim 12, wherein the processing circuitry is further configured to:
determine that beam failure occurs on the PCell when at least one of one or more serving control channels fails, the PCell being configured with the one or more serving control channels to communicate with the network; and
when the beam failure is determined to occur on the PCell,
- send a BFR SR to the network using the PUCCH configured for the PCell, the BFR SR indicating the beam failure of the PCell and requesting other resources to report the beam failure of the PCell;
- receive priority scheduling for the other resources from the network using the channel configured for the PCell, the other resources including a BFRQ Medium Access Control (MAC) control element (CE) that indicates a cell index of the PCell and a new beam index for a new candidate beam for the PCell;
- send a BFRQ using the other resources to the network by sending the BFRQ MAC CE using a PUSCH configured for the PCell, the BFRQ indicating the cell index of the PCell and the new beam index of the new candidate beam for the PCell; and
- receive a new beam update from the network.

15. The electronic device according to claim 12, wherein the BFR SR has a BFR SR configuration including a period and an offset.

16. The electronic device according to claim 15, wherein the BFR SR configuration is associated with a PUCCH format 0 that includes multiple cyclic shifts, one or more of the multiple cyclic shifts being configured for at least one of: 1) the BFR SR and 2) the BFR SR and at least one of hybrid automatic repeat requests (HARQs).

17. The electronic device according to claim 15, wherein sending the BFR SR further comprises:
when the BFR SR is scheduled at a same time with a SR, sending the BFR SR prior to sending the SR or sending the BFR SR and the SR simultaneously.

18. The electronic device according to claim 15, wherein the plurality of cells includes a first subset of cells and a second subset of cells;
the BFR SR configuration is configured for the first subset of cells to report a beam failure for the first subset of cells, the first subset of cells including the SCell; and
another BFR SR configuration is configured for the second subset of cells to report a beam failure for the second subset of cells.

* * * * *